US012812326B2

(12) United States Patent
Seo et al.

(10) Patent No.: US 12,812,326 B2
(45) Date of Patent: Nov. 24, 2026

(54) ELECTRONIC DEVICE USING GEOFENCE AND OPERATION METHOD

(71) Applicant: Samsung Electronics Co., Ltd., Suwon-si (KR)

(72) Inventors: Yunhwa Seo, Suwon-si (KR); Myeongwoo Koo, Suwon-si (KR); Sunggyu Lee, Suwon-si (KR); Sunggyu Yim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 227 days.

(21) Appl. No.: 18/582,128

(22) Filed: Feb. 20, 2024

(65) Prior Publication Data

US 2024/0196162 A1 Jun. 13, 2024

Related U.S. Application Data

(63) Continuation of application No. PCT/KR2022/013998, filed on Sep. 20, 2022.

(30) Foreign Application Priority Data

Nov. 3, 2021 (KR) ........................ 10-2021-0149762
Nov. 10, 2021 (KR) ........................ 10-2021-0154175

(51) Int. Cl.
*H04W 4/02* (2018.01)
*G01S 5/00* (2006.01)
(Continued)

(52) U.S. Cl.
CPC ............. *H04W 4/021* (2013.01); *G01S 5/019* (2020.05); *G01S 5/0205* (2013.01)

(58) Field of Classification Search
CPC ....... H04W 4/021; G01S 5/019; G01S 5/0205
(Continued)

(56) References Cited

U.S. PATENT DOCUMENTS 10,863,435 B2 12/2020 Cho et al.
11,076,260 B2 7/2021 Yoo et al.
(Continued)

FOREIGN PATENT DOCUMENTS

KR 10-1838967 B1 3/2018
KR 10-1932395 B1 12/2018
(Continued)

OTHER PUBLICATIONS

International Search Report dated Jan. 6, 2023, issued in International Application No. PCT/KR2022/013998.
(Continued)

*Primary Examiner* — Joel Ajayi
(74) *Attorney, Agent, or Firm* — Jefferson IP Law, LLP

(57) ABSTRACT

An electronic device is provided. The electronic device includes one or more application processor, memory electrically coupled with the one or more application processor, and a wireless communication chipset which supports a short-range communication and is electrically coupled to the one or more application processor, wherein the wireless communication chipset is configured to receive an advertising packet broadcast by a first external device with a specified interval, and wherein the memory stores instructions that, when executed by the one or more application processor, cause the electronic device to obtain first locations of the electronic device, measured in response to receiving a plurality of first advertising packets by the wireless communication chipset while the first external device is located in a first point, and determine a first geofence corresponding to the first external device located in the first point, based on at least some of the obtained first locations.

20 Claims, 19 Drawing Sheets

(51) Int. Cl.
*G01S 5/02* (2010.01)
*H04W 4/021* (2018.01)

(58) Field of Classification Search
USPC .......................................................... 455/456.1
See application file for complete search history.

(56) References Cited

U.S. PATENT DOCUMENTS

| | | | | |
|---|---|---|---|---|
| 2013/0085861 | A1* | 4/2013 | Dunlap | G06Q 30/0251 705/14.58 |
| 2015/0350355 | A1* | 12/2015 | Linn | H04L 67/535 709/217 |
| 2016/0165393 | A1* | 6/2016 | Pang | H04W 4/025 455/456.1 |
| 2016/0366552 | A1 | 12/2016 | Huang | |
| 2017/0101110 | A1 | 4/2017 | Yoo | |
| 2018/0091939 | A1 | 3/2018 | Venkatraman et al. | |
| 2018/0180704 | A1 | 6/2018 | Khan et al. | |
| 2020/0022103 | A1 | 1/2020 | Kim et al. | |
| 2020/0305142 | A1 | 9/2020 | Jang et al. | |
| 2020/0404448 | A1 | 12/2020 | Park et al. | |
| 2021/0006936 | A1 | 1/2021 | Wirola et al. | |
| 2021/0037339 | A1 | 2/2021 | Ornelas et al. | |
| 2021/0227349 | A1 | 7/2021 | Ahmed et al. | |
| 2021/0258914 | A1 | 8/2021 | Lim et al. | |
| 2023/0262415 | A1 | 8/2023 | Seo et al. | |
| 2023/0336940 | A1 | 10/2023 | Yim et al. | |

FOREIGN PATENT DOCUMENTS

| | | | |
|---|---|---|---|
| KR | 10-2020-0007601 | A | 1/2020 |
| KR | 10-2020-0007608 | A | 1/2020 |
| KR | 10-2020-0111558 | A | 9/2020 |
| WO | 2020/169179 | A1 | 8/2020 |
| WO | 2022/177343 | A1 | 8/2022 |

OTHER PUBLICATIONS

Extended European Search Report dated Jun. 28, 2024, issued in European Patent Application No. 22890170.8.
Korean Office Action dated Apr. 1, 2026, issued in Korean Patent Application No. 10-2021-0154175.
Korean Notice of Patent Grant dated Sep. 1, 2026, issued in Korean Patent Application No. 10-2021-0154175.

* cited by examiner

ELECTRONIC DEVICE USING GEOFENCE AND OPERATION METHOD

CROSS-REFERENCE TO RELATED APPLICATION(S)

This application is a continuation application, claiming priority under § 365(c), of an International application No. PCT/KR2022/013998, filed on Sep. 20, 2022, which is based on and claims the benefit of a Korean patent application number 10-2021-0149762, filed on Nov. 3, 2021, in the Korean Intellectual Property Office, and of a Korean patent application number 10-2021-0154175, filed on Nov. 10, 2021, in the Korean Intellectual Property Office, the disclosure of each of which is incorporated by reference herein in its entirety.

BACKGROUND

1. Field

The disclosure relates to an electronic device using a geofence and an operation method thereof.

2. Description of Related Art

A geofence may be understood as a virtual fence which forms a virtual boundary or zone, based on latitude and longitude. An electronic device may determine whether the electronic device is located inside the geofence, based on the latitude and the longitude, and may provide a user with various services, based on the determination.

Meanwhile, recently, there is a growing interest in a Bluetooth technology which is a technical standard of two-way short-range communication between electronic devices. The Bluetooth communication scheme is a short-range wireless communication technology which wirelessly couples the electronic devices placed at a near distance to enable two-way real-time data transmission and reception. Since the Bluetooth communication scheme has been adopted as a standard for wireless communication, various technologies are being developed, and the scope of using the technologies is increasing due to significantly low power consumption.

The above information is presented as background information only to assist with an understanding of the disclosure. No determination has been made, and no assertion is made, as to whether any of the above might be applicable as prior art with regard to the disclosure.

SUMMARY

An electronic device may determine a geofence, based on location information (e.g., latitude and longitude information) collected within a specified range. However, when the electronic device determines the geofence by learning only the location information, accuracy of the geofence may decrease due to the location information which is inaccurate to some extent, or it may take a long time to determine the geofence. In addition, since a positioning timing for obtaining a location to be used in determining the geofence cannot be specified, the electronic device may have to continuously measure the location of the electronic device. In this case, the electronic device may not be able to maintain a low-power state, resulting in more power consumption.

In various embodiments of the disclosure, the geofence may be determined based on locations measured in response to receiving a signal from an external device.

Aspects of the disclosure are to address at least the above-mentioned problems and/or disadvantages and to provide at least the advantages described below. Accordingly, an aspect of the disclosure is to provide an electronic device using geofence and operation method.

Additional aspects will be set forth in part in the description which follows and, in part, will be apparent from the description, or may be learned by practice of the presented embodiments.

In accordance with an aspect of the disclosure, an electronic device is provided. The electronic device includes one or more application processors, memory electrically coupled with the one or more application processors, and a wireless communication chipset which supports a short-range communication and is electrically coupled to the one or more application processors, wherein the wireless communication chipset may be configured to receive an advertising packet broadcast by a first external device with a specified interval, and wherein the memory store one or more programs including computer-executable instructions that, when executed by the one or more application processors, cause the electronic device to obtain first locations of the electronic device, measured in response to receiving a plurality of first advertising packets by the wireless communication chipset while the first external device is located in a first point, and determine a first geofence corresponding to the first external device located in the first point, based on at least some of the obtained first locations.

In accordance with an aspect of the disclosure, a method performed by an electronic device is provided. The method includes obtaining first locations of the electronic device which are measured in response to receiving a plurality of first advertising packets broadcasted by a first external device with a specified interval by a wireless communication chipset using a short-range communication while the first external device is located in a first point, and determining a first geofence corresponding to the first external device located in the first point, based on at least a part of the obtained first locations.

In accordance with an aspect of the disclosure, one or more non-transitory computer-readable storage media storing one or more programs including computer-executable instructions that, when executed by one or more processors of an electronic device, cause the electronic device to perform operations are provided. The operations include obtaining first locations of the electronic device which are measured in response to receiving a plurality of first advertising packets broadcasted by a first external device with a specified interval by a wireless communication chipset using a short-range communication while the first external device is located in a first point, and determining a first geofence corresponding to the first external device located in the first point, based on at least a part of the obtained first locations.

In accordance with another aspect of the disclosure, an electronic device is provided. The electronic device includes one or more application processor and a wireless communication chipset which supports Bluetooth Low Energy (BLE) communication and is electrically coupled to the one or more application processor. The wireless communication chipset may be configured to receive the BLE signal broadcast by the first external device with a specified interval. The one or more application processor may obtain first locations of the electronic device, measured in response to receiving a plurality of first BLE signals by the wireless communication chipset while the first external device is located in a first point, determine a first geofence corresponding to the first external device located in the first point, based on at least some of the obtained first locations, obtain second locations of the electronic device, measured in response to receiving a plurality of second BLE signals by the wireless communication chipset from the first external device in a state where the first external device moves to a second point different from the first point, and determine a second geofence corresponding to the first external device located in the second point, based on at least some of the second locations.

According to various embodiments of the disclosure, an electronic device may determine a geofence, based on locations measured in response to receiving an advertising signal from an external device, thereby preventing inaccurate location information from being used as training data.

In addition, according to various embodiments, an electronic device may measure a location in response to receiving an advertising signal from an external device, thereby reducing power consumption.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory or the one or more computer programs may be divided with different portions stored in different multiple memories.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphical processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

Figure 1:
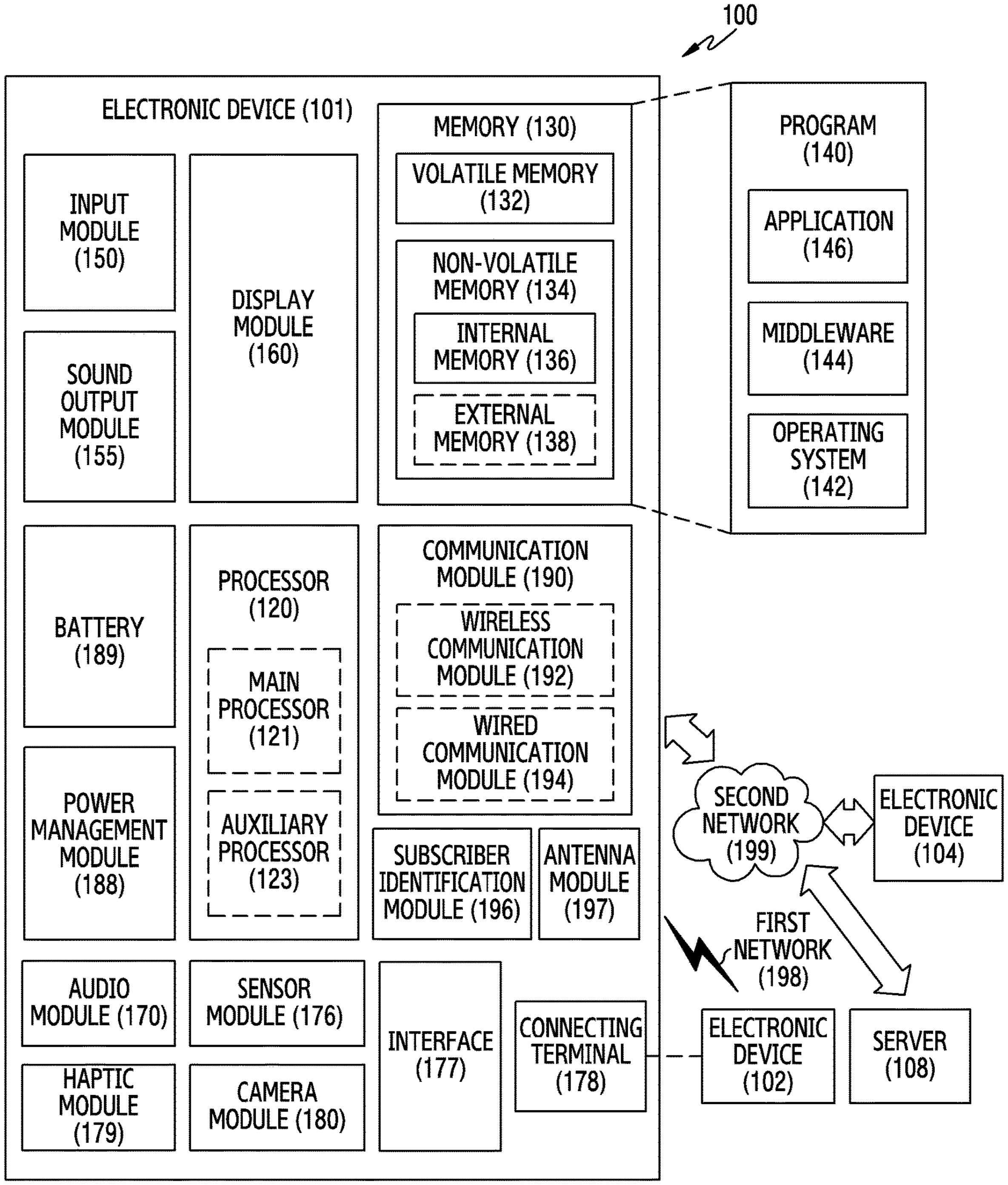
FIG. 1 illustrates an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IOT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration.

According to various embodiments, operations performed by the module, the program, or another component may be carried out sequentially, in parallel, repeatedly, or heuristically, or one or more of the operations may be executed in a different order or omitted, or one or more other operations may be added.

Figure 2:
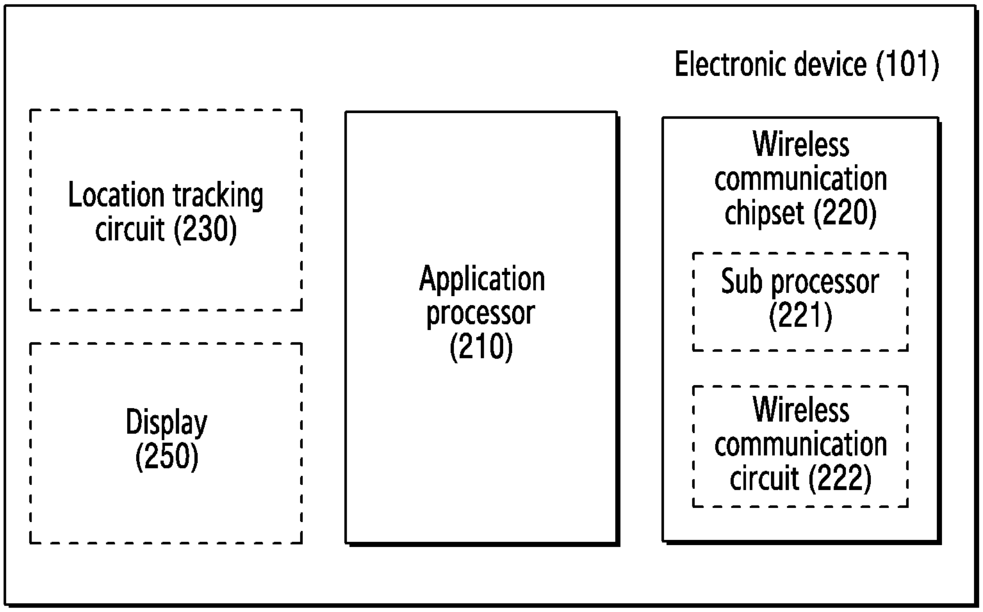
FIG. 2 is a block diagram of an electronic device according to an embodiment of the disclosure.

FIG. 2 is a block diagram of an electronic device according to an embodiment of the disclosure.

Referring to FIG. 2, the electronic device 101 according to an embodiment may include an application processor 210 (e.g., the processor 120 of FIG. 1), a wireless communication chipset 220, a location tracking circuit 230, and/or a display 250 (e.g., the display module 160 of FIG. 1). The application processor 210 of the disclosure may include at least one processor. For example, the application processor 210 may include a plurality of processors. For example, the application processor 210 may include one processor.

Operations of the application processor 210, performed in FIGS. 1 to 6, 7A to 7C, and 8 to 17 of the disclosure, may be performed by one processor. The operations of the application processor 210, performed in FIGS. 1 to 6, 7A to 7C, and 8 to 17 of the disclosure, may be performed by a plurality of processors by being divided step by step.

The application processor 210 of the disclosure is for exemplary purposes only. Therefore, the application processor 210 of the disclosure may be replaced with any processor in the electronic device 101, and the operations of the application processor 210 of the disclosure may be replaced with operations of any processor in the electronic device 101.

According to an embodiment, the application processor 210 may measure a location of the electronic device 101. For example, the application processor 210 may identify the location of the electronic device 101 by measuring latitude and/or longitude of the electronic device 101 in response to receiving a signal from an external device. As another example, the application processor 210 may identify a relative location of the electronic device 101 by measuring a relative distance between the external device and the electronic device 101 in response to receiving the signal from the external device.

According to an embodiment, the application processor 210 may minimize power consumption by transitioning to a low-power state when a specified event occurs. For example, when there is no user input for the electronic device 101 for a specified duration or when a user activates the low-power state through a user input (e.g., a touch input) for the display 250, the application processor 210 may transition to the low-power state. In an embodiment, the application processor 210 may be released from the low-power state when the specified event occurs. For example, when a call is received from the external device in the low-power state or when the user input (e.g., the touch input) is received for the display 250, the application processor 210 may be released from the low-power state. In an embodiment, the electronic device 101 may identify a location even when the application processor 210 is in the low-power state. For example, when the application processor 210 is in the low-power state, the electronic device 101 may identify the location of the electronic device 101 by receiving location information of the electronic device 101 from the external device.

According to an embodiment, the wireless communication chipset 220 may be electrically coupled to the application processor 210. For example, the wireless communication chipset 220 may include a sub processor 221 and/or a wireless communication circuit 222. In an embodiment, the wireless communication chipset 220 may establish a connection of short-range communication (e.g., low-energy Bluetooth communication) with at least one external device. For example, the sub processor 221 may control the wireless communication circuit 222 to establish a communication connection by receiving a Bluetooth Low Energy (BLE) signal (e.g., an advertising packet) from a first external device. The advertising signal of the disclosure may be substantially identical to, for example, the BLE signal.

In an embodiment, the sub processor 221 may transmit and/or receive data with respect to the first external device via the wireless communication circuit 222. Although it is illustrated in the embodiment of FIG. 2 that the sub processor 221 performs short-range communication with the external device by using the wireless communication circuit 222 included in the wireless communication chipset 220, this is only an embodiment. In another embodiment, the sub processor 221 may perform short-range communication with the external device by using an additional wireless communication circuit of the electronic device 101 not included in the wireless communication chipset 220. According to an embodiment, the wireless communication chipset 220 may establish a connection of short-range communication (e.g., low-power Bluetooth communication) even when the application processor 210 is in the low-power state.

According to another embodiment, the wireless communication chipset 220 may support not only short-range communication but also cellular communication (e.g., second generation (2G) communication, third generation (3G) communication, Long Term Evolution (LTE) communication, and/or New Radio (NR) communication). In an embodiment, the electronic device 101 may identify the location of the electronic device 101 or external device by using the wireless communication chipset 220. For example, the wireless communication chipset 220 may support a Cellular Positioning System (CPS) and/or a Wi-Fi Positioning System (WPS), based on the cellular communication. In an embodiment, the electronic device 101 may identify the location of the electronic device 101 or external device by using the CPS and/or WPS supported by the wireless communication chipset 220.

It may be understood that the operation performed by the wireless communication chipset 220 of the disclosure is substantially performed by the sub processor 221 of the wireless communication chipset 220.

According to an embodiment, the location tracking circuit 230 may be electrically coupled to the application processor 210 and the wireless communication chipset 220. In an embodiment, the location tracking circuit 230 may include, for example, a Global Navigation Satellite System (GNSS) circuit. In an example, the GNSS circuit may support a satellite navigation system based on Global Positioning System (GPS), Global Navigation Satellite System (GLONASS), Galileo, Beidou, Quasi-Zenith Satellite System (QZSS), and Navigation Indian Constellation (NAVIC). In an embodiment, the wireless communication chipset 220 may identify the location of the external device by using the location tracking circuit 230.

However, a method in which the wireless communication chipset 220 identifies the location of the external device may include various methods in addition to the method of identifying the latitude/longitude location of the external device via the location tracking circuit 230. For example, the wireless communication chipset 220 may identify the location of the external device, based on Round Trip Time (RTT) and Angle of Arrival (AOA) of a Radio Frequency (RF) signal received from the external device via an Ultrawide Band (UWB) antenna (e.g., the antenna module 197 of FIG. 1). For instance, after transmitting a distance measurement request message to the external device via the UWB antenna, the wireless communication chipset 220 may identify a time (RTT) required to receive a response message for the distance measurement request from the external device, and may identify a Time Of Flight (TOF) which is a time required when a radio wave is transmitted from the electronic device 101 to reach the external device, based on the RTT. The electronic device 101 may identify a relative distance between the electronic device 101 and the external device through the TOF. In addition, the electronic device 101 may include at least three UWB antennas, and the electronic device 101 may identify the AOA of the RF signal received from the external device, based on a phase difference of an RF signal received by the UWB antennas from the external device and a physical distance by which the UWB antennas are spaced apart, and may identify a direction in which the external device is located, based on the AOA. As a result, the electronic device 101 may identify the location of the external device, based on the identified TOF and AOA.

As another example, when a communication connection is established between the external device and the electronic device 101 but it is a state where the connection is released, the relative distance may be estimated based on information on the location of the external device, received from the external device while the communication connection is established.

Although it is illustrated in FIG. 2 that the electronic device 101 includes the application processor 210, the wireless communication chipset 220, the location tracking circuit 230, and/or the display 250, this is only an example. The electronic device 101 may include the application processor 210 and the wireless communication chipset 220, and other components (e.g., the wireless communication chipset 220, the location tracking circuit 230, and the display 250) may be omitted.

Figure 3:
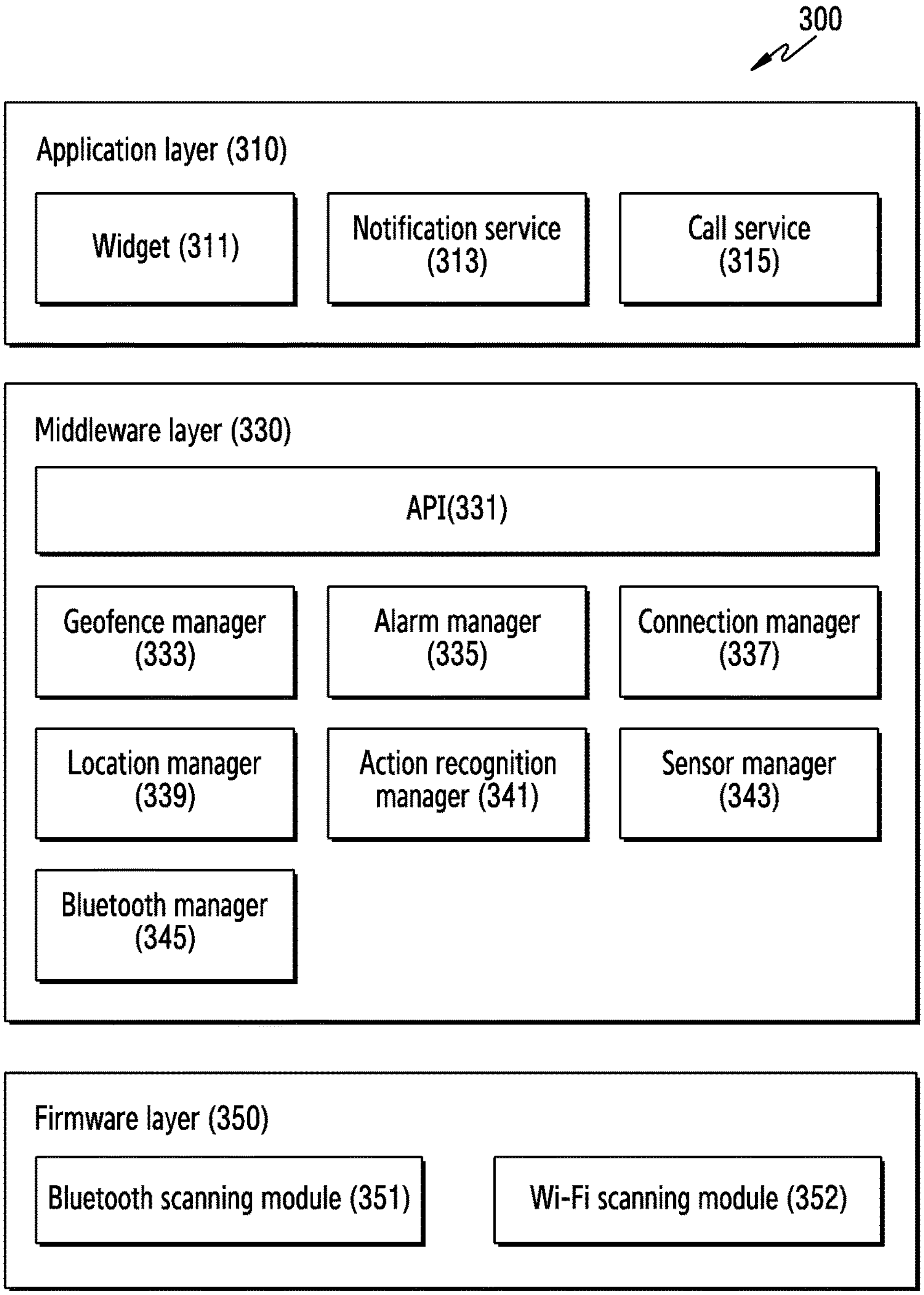
FIG. 3 is a block diagram illustrating a software layer of an electronic device according to an embodiment of the disclosure.

FIG. 3 is a block diagram illustrating a software layer of an electronic device according to an embodiment of the disclosure.

Referring to FIG. 3, at least part of a software layer 300 according to an embodiment may include, for example, an application layer 310, a middleware layer 330, and/or a firmware layer 350. The software layer 300 according to an embodiment may be stored in advance, for example, in the electronic device 101. As another example, the software layer 300 may be downloaded from an external device or an external server.

According to an embodiment, the application layer 310 may include an operating system to control a resource related to the electronic device 101 and/or various applications (e.g., the application 146 of FIG. 1) driven on the operating system. For example, the operating system may include Android™, iOS™, Windows™, Symbian™, Tizen™, or Bada™.

According to an embodiment, the application layer 310 may provide a function capable of interacting with a user of the electronic device 101. For example, the application layer 310 may provide the function capable of interacting with the user through a user interface displayed on the display 250. In an embodiment, the application layer 310 may provide a function related to an operation of determining a geofence by using a widget 311. For example, the application layer 310 may display on the display 250 the user interface for allowing the user to identify whether location information of the electronic device 101 is correct by using the widget 311. In an example, when the user inputs information indicating that the location information is incorrect, the electronic device 101 may not utilize corresponding information when determining the geofence. As another example, when the user inputs the information indicating that the location information is incorrect and inputs correct location information (e.g., latitude and longitude) to the electronic device 101, the electronic device 101 may utilize corresponding information when determining the geofence. In an embodiment, the application layer 310 may provide the user with a notification service 313. For example, when the electronic device 101 is located inside the geofence, the application layer 310 may display the user interface on the display 250 of the electronic device 101 to display that the electronic device 101 is located inside the geofence by using the notification service 313. As another example, when the electronic device 101 is located inside the geofence and then moves outside the geofence, the application layer 310 may display the user interface to indicate that the electronic device 101 is outside the geofence. In an embodiment, when a call signal is received from the external device through a call service 315, the application layer 310 may display the user interface on the display 250 of the electronic device 101 to inform that the call signal is received. In an embodiment, in order to use services of the application layer 310, the application processor 210 or a main processor (e.g., the main processor 121 of FIG. 1) may need to be not in a low-power state. However, the electronic device 101 may implement an Always On Display (AOD) by using a Display Driver Integrated Circuit (DDIC), and the electronic device 101 may implement at least some of services of the application layer 310 even when the application processor 210 is in the low-power state through the AOD.

According to an embodiment, the middleware layer 330 may include an Application Programming Interface (API) 331 which may be commonly used by several applications (e.g., the application 146) of the application layer 310. In an embodiment, the middleware layer 330 may include modules which provide several services through the API 331. For example, the middleware layer 330 may include components to be described below with reference to FIG. 5, i.e., a geofence manager 333, an alarm manager 335, a connection manager 337 which controls a connection with the external device, a location manager 339 which transmits and/or receives information on a location of the electronic device 101 and external device or measures the location, an action recognition manager 341, a sensor manager 343 which controls at least one sensor of the electronic device 101, and/or a Bluetooth™ manager 345 which controls a short-range communication connection (e.g., low-power Bluetooth) of the electronic device 101. In an embodiment, the API 331 is an interface for controlling a function provided by the middleware layer 330, for example, at least one interface or function (e.g., an instruction) for file control, window control, image processing, or character control. In an embodiment, the alarm manager 335 may adjust an interval of maintaining the low-power state of the application processor 210 or the main processor. In an embodiment, the connection manager 337 may correspond to a module which couples a data network and a communication network, and may include, for example, not only information on a connection state of a cell from a processor of controlling Wi-Fi but also a module which enables communication with the server. In an embodiment, the location manager 339 may be a module which manages location information of the electronic device 101. In an embodiment, the location manager 339 may receive a location information request of the electronic device 101 from the geofence manager 333, and may request the positioning system to perform positioning on the location of the electronic device 101 in response to the request. In an embodiment, the location manager 339 may receive information on the location of the electronic device 101 from the positioning system. The location manager 339 may transmit the received information on the location of the electronic device 101 to the geofence manager 333. In an embodiment, the positioning system may include at least one of a GNSS system (e.g., a GPS system), a WPS system, a Network Location Provider (NLP) system, and a CPS system.

In an embodiment, the sensor manager 343 may obtain information of the electronic device 101 from at least one sensor (e.g., a temperature-humidity sensors, a proximity-illuminance sensors), and may transmit the obtained information to the application layer 310. In an embodiment, the action recognition manager 341 may correspond to a module which obtains information on the motion of the electronic device 101 from the sensor manager 343 to estimate a user's activity. For example, the action recognition manager 341 may estimate a situation regarding whether the user is walking, running, or riding a bicycle or car, based on the information on the motion of the electronic device 101, obtained from the sensor manager 343.

According to an embodiment, the firmware layer 350 may include a Bluetooth scanning module 351 and/or a Wi-Fi scanning module 352. In an embodiment, logics of the firmware layer 350 may be performed by using only the wireless communication chipset 220. For example, the wireless communication chipset 220 may include an additional sub processor 221, and the sub processor 221 may receive a BLE signal (e.g., an advertising signal) transmitted by the external device via the Bluetooth scanning module 351. In an example, upon receiving the BLE signal via the Bluetooth scanning module 351, the sub processor 221 may establish a short-range communication (BLE communication) connection with the external device. As another example, the sub processor 221 may receive the advertising signal transmitted by the external device via the Wi-Fi scanning module 352. In an embodiment, upon receiving the advertising signal via the Wi-Fi scanning module 352, the sub processor 221 may establish a Wi-Fi communication connection with the external device.

According to an embodiment, the Bluetooth scanning module 351 and/or Wi-Fi scanning module 352 driven by the wireless communication chipset 220 may perform an operation even when the application processor 210 is in a low-power state. After the application processor 210 is released from the low-power state, the Bluetooth scanning module 351 and/or the Wi-Fi scanning module 352 may transfer information (e.g., information of the external device, information on a communication type) related to scanning to the application processor 210.

In an embodiment of FIG. 3, it may be understood that a function performed by the application layer 310, the middleware layer 33 (e.g., the geofence manager 333), and/or the firmware layer 350 is performed when the wireless communication chipset 220 and/or the application processor 210 execute instructions stored in the memory 130. In addition, in an embodiment, the electronic device 101 may use one or more hardware processing circuits to perform various functions and operations of the disclosure. In addition, a connection relation between hardware and/or software of FIG. 3 is for convenience of explanation, and a flow and/or direction of data or instructions are not limited thereto.

Figure 4:
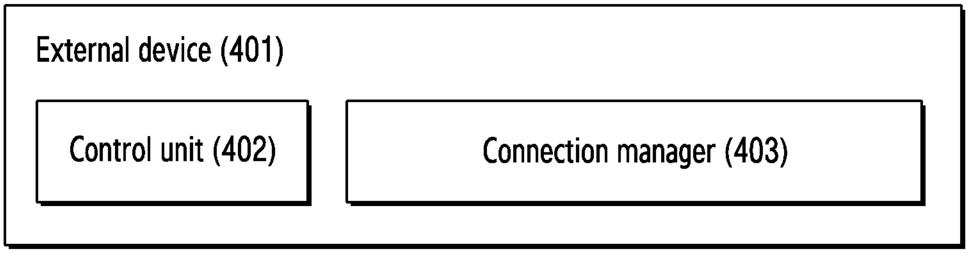
FIG. 4 illustrates an external device according to an embodiment of the disclosure.

FIG. 4 illustrates an external device according to an embodiment of the disclosure.

Referring to FIG. 4, a first external device 401 according to an embodiment may be disposed in a fixed location at a specified timing. For example, the first external device 401 may be fixed to a first location at a timing at which the electronic device 101 receives a signal from the first external device 401 via the Bluetooth scanning module 351. In an example, information on the first location of the first external device 401 may be stored in a memory (e.g., the memory 130 of FIG. 1) of the electronic device 101.

According to an embodiment, the first external device 401 may correspond to various types of devices. For example, the first external device 401 may correspond to a portable terminal (e.g., a bar-type electronic device, a foldable electronic device, a rollable electronic device). As another example, the first external device 401 may correspond to a wearable device (e.g., a wireless earphone, a smart watch). As another example, the first external device 401 may be a car or other means of transportation (e.g., a train, an airplane) which is stationary at a specified timing. As another example, the first external device 401 may correspond to a television, a refrigerator, and/or a washing machine. As a result, the first external device 401 may correspond to a device capable of establishing a communication connection with the electronic device 101.

According to an embodiment, the first external device 401 may include a control unit 402 and/or a connection manager 403. In an embodiment, the control unit 402 may correspond to a module for controlling an operation of the first external device 401. The term 'control unit' may be replaced with a control module or a controller.

According to an embodiment, the control unit 402 may establish a communication connection with the electronic device 101 and/or additional external devices via the connection manager 403, and may transmit and/or receive data. In an embodiment, the control unit 402 may control the operation of the first external device 401, based on information received via the connection manager 403. For example, the first external device 401 may correspond to a wireless earphone, and the control unit 402 may receive a signal including information on a speaker volume control of the first external device 401 from the electronic device 101 via the connection manager 403. The control unit 402 may control the volume of the first external device 401, based on the information on the speaker volume control. In an embodiment, the connection manager 403 may correspond to a module of controlling a wireless connection between the first external device 401 and the electronic device 101, and the connection manager 403 may control a wireless connection between the first external device 401 and the additional external devices. In an embodiment, the connection manager 403 may perform a variety of wireless communication (e.g., Wi-Fi communication) in addition to Bluetooth communication. The connection manager 403 may establish a low-power Bluetooth communication connection with the electronic device 101 by transmitting a signal (e.g., an advertising packet) to the electronic device 101.

Figure 5:
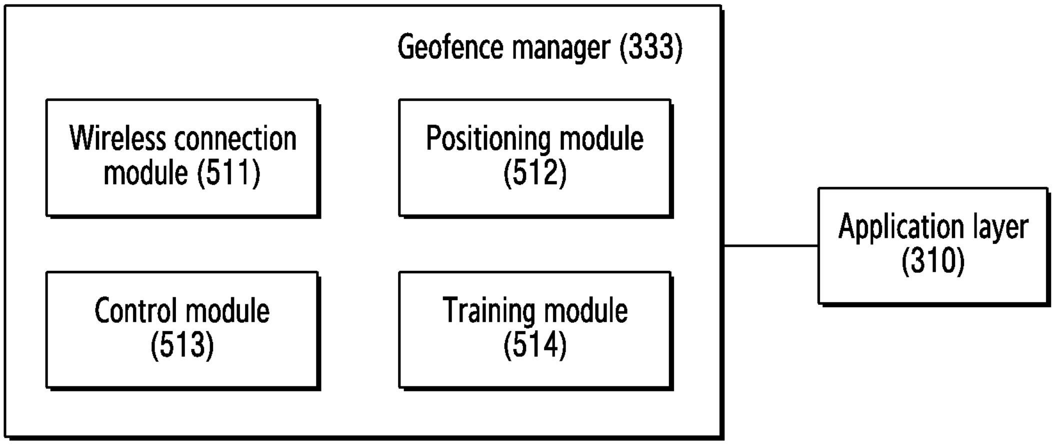
FIG. 5 illustrates a structure of a geofence manager according to an embodiment of the disclosure.

FIG. 5 illustrates a structure of a geofence manager according to an embodiment of the disclosure.

Referring to FIG. 5, the geofence manager 333 according to an embodiment may include a wireless connection module 511, a positioning module 512, a control module 513, and/or a training module 514.

According to an embodiment, the wireless connection module 511 may receive an advertising packet (or a BLE signal) from the first external device 401. In an embodiment, the wireless connection module 511 may be configured to receive the advertising packet from the first external device 401 with a specified interval. The wireless connection module 511 may receive the advertising packet from the first external device 401 even when the application processor 210 is in a low-power state. In addition, the wireless connection module 511 may receive a signal indicating that an event occurs from the first external device 401 when a specified event occurs in the first external device 401. The specified event may mean a case where the wireless communication connection is established with the first external device 401 or when the established communication connection is released.

According to an embodiment, the positioning module 512 may be a module which measures a location of the electronic device 101. The positioning module 512 may perform positioning by using a location provider (e.g., a GNSS system (e.g., a GPS system), a WPS system, a Network Location Provider (NLP) system, or a CPS system) in response to a location measurement request. In addition, the positioning module 512 may identify the location of the electronic device 101 in such a manner that a location obtained by other applications is received other than direct positioning through the location provider.

According to an embodiment, the control module 513 may determine whether the electronic device 101 enters into a geofence to reliably provide a geofence service. For example, the control module 513 may identify whether the electronic device 101 enters into the geofence, based on information on the location of the electronic device 101, received from the positioning module 512. The geofence may be determined by a center coordinate of the geofence consisting of latitude and longitude and a specific distance (e.g., a radius) from the center coordinate of the geofence. The control module 513 may determine a state of the electronic device 101 to “in” when the electronic device 101 enters into the geofence, based on information on the location of the electronic device 101, received from the positioning module 512. In an embodiment, the control module 513 may determine whether the electronic device 101 is out of the geofence to reliably provide a geofence service. For example, the control module 513 may determine the state of the electronic device 101 to “out” when it is determined that the electronic device is out of the geofence, based on the information on the location of the electronic device 101, received from the positioning module 512.

According to an embodiment, the control module 513 may perform positioning of the electronic device 101 via the positioning module 512 when determining whether the electronic device 101 is located inside the determined geofence. In an embodiment, the control module 513 may determine a positioning interval, based on an environment where the electronic device 101 is located. For example, when the electronic device 101 corresponds to a car, the electronic device 101 may be located on a ground. The control module 513 may measure the location of the electronic device 101 with a first interval, and may determine whether the electronic device 101 enters into the geofence, based on the measured location of the electronic device 101. As another example, the electronic device 101 may be located in an underground parking lot. In an embodiment, the control module 513 may perform only positioning using cellular communication in a communication environment of the underground parking lot, and the measured location of the electronic device 101 may be inaccurate to some extent. Accordingly, for user convenience, when the electronic device 101 is located in a place where the communication environment is limited, such as the underground parking lot, the control module 513 may perform positioning with a second interval shorter than the first interval via the positioning module 512.

According to an embodiment, the training module 514 may identify locations of the electronic device 101, measured by the positioning module 512. The training module 514 may determine the geofence, based on at least some of the identified locations. For example, the training module 514 may determine a center point and radius of the geofence, based on the identified locations. In an embodiment, when determining the geofence, the training module 514 may determine the geofence, based on third locations excluding second locations corresponding to a specified condition from first locations of the electronic device 101, measured by the positioning module 512. For example, the training module 514 may identify that a timing of measuring a first location among the first locations differs from a timing of determining the geofence by more than a specified time. In an embodiment, the training module 514 may determine the geofence, based on locations excluding the first location from the first locations. As another example, when the first location among the first locations has low accuracy and/or reliability, the training module 514 may determine the geofence, based on the locations excluding the first location. In an embodiment, the training module 514 may determine whether the determined geofence is usable to provide a service. For example, the training module 514 may determine whether it is a case where the determined geofence is incorrect (e.g., a case where the radius of the geofence exceeds a specified length). In an embodiment, upon determining that the determined geofence is incorrect, the training module 514 may determine whether additional positioning is required. According to an embodiment, the training module 514 may determine whether there is a need to determine a new second geofence due to a change in a location of the first external device 401 after a first geofence is determined. Upon determining that there is a need to determine the second geofence, the training module 514 may determine the second geofence, based on at least some of the locations of the electronic device 101, measured after the location of the external device changes.

According to an embodiment, the control module 513 may determine an interval by which the positioning module 512 performs positioning. For example, the positioning module 512 may perform positioning when the electronic device 101 receives an advertising packet from the first external device 401. In an embodiment, the control module 513 may control the wireless communication chipset 220 to scan the advertising packet of the first external device 401 with a specified interval. Since the positioning module 512 performs the positioning only when the advertising packet of the first external device 401 is received, the control module 513 may determine a positioning interval by determining a scan interval of the wireless communication chipset 220. In an embodiment, the control module 513 may determine the positioning interval, based on a communication environment of the electronic device 101 and the first external device 401. For example, assuming that the first external device 401 is a car, when communication between the electronic device 101 and the first external device 401 is smooth, the control module 513 may provide control to receive the adverting packet of the first external device 401 with a first interval. On the other hand, when the first external device 401 is located in an underground parking lot and thus communication with the electronic device 101 is not smoothly achieved, the control module 513 may control the electronic device 101 to receive the advertising packet with a second interval shorter than the first interval. According to an embodiment, when locations measured using a specific positioning system have low accuracy or reliability among the first locations of the electronic device 101, received from the positioning module 512, the control module 513 may determine the geofence, based on the third locations excluding the second locations measured using the specific positioning system. For example, the control module 513 may receive the first locations including locations measured from the positioning module 512 via a GPS system and locations measured using a Wi-Fi network. In an example, when the second locations measured using the Wi-Fi network have the low accuracy and/or reliability, the control module 513 may determine the geofence, based on the third locations excluding the second locations from the first locations.

According to an embodiment, the control module 513 may control the positioning module 512 to stop positioning when the positioning module 512 has difficulty in measuring a location (e.g., latitude and longitude) of the electronic device 101. In addition, the control module 513 may display a user interface indicating the difficulty in determining the geofence to a user via the display 250.

According to an embodiment, the control module 513 may perform monitoring on a registered geofence. In an embodiment, the control module 513 may receive information on a changed geofence from the training module 514. In an embodiment, the information on the changed geofence may include information on a change in a first location of the first external device 401 located at a center of the geofence or a change in a size of a specified range (e.g., a first range). In an embodiment, the control module 513 may identify a new geofence, based on the information on the changed geofence. For example, when the first external device 401 is changed from the first location to a second location, the control module 513 may identify the new geofence centered at the second location. In an embodiment, the control module 513 may identify in/out of the electronic device 101 with respect to the new geofence. For example, in a case where the first external device 401 is a mobility device (e.g., a car), when the first external device 401 (e.g., the car) parked at the first location moves to park at the second location, the control module 513 may identify the new geofence centered at the second location from a timing at which the first external device 401 is parked at the second location, and may identify in/out of the electronic device 101 with respect to the new geofence.

According to an embodiment, the control module 513 may determine whether the first geofence determined by the training module 514 has more than specified accuracy. When the first geofence has more than the specified accuracy, the control module 513 may transfer information associated with the determined first geofence to the application layer 310. In an embodiment, the application layer 310 may provide a user with a service, based on the transferred information associated with the first geofence. For example, the information associated with the first geofence may include information on the first external device 401, the location of the first external device 401, the radius of the first geofence, and/or the center point of the first geofence.

In the embodiment of FIG. 5, it may be understood that functions performed by the wireless connection module 511, positioning module 512, control module 513, and/or training module 514 included in the geofence manager 333 are performed when the wireless communication chipset 220 and/or the application processor 210 execute instructions stored in the memory 130. In addition, in an embodiment, the electronic device 101 may use one or more hardware processing circuits to perform various functions and operations of the disclosure. In addition, a connection relationship between hardware and/or software of FIG. 5 is for convenience of explanation and does not limit a flow and/or direction of data or instructions.

Figure 6:
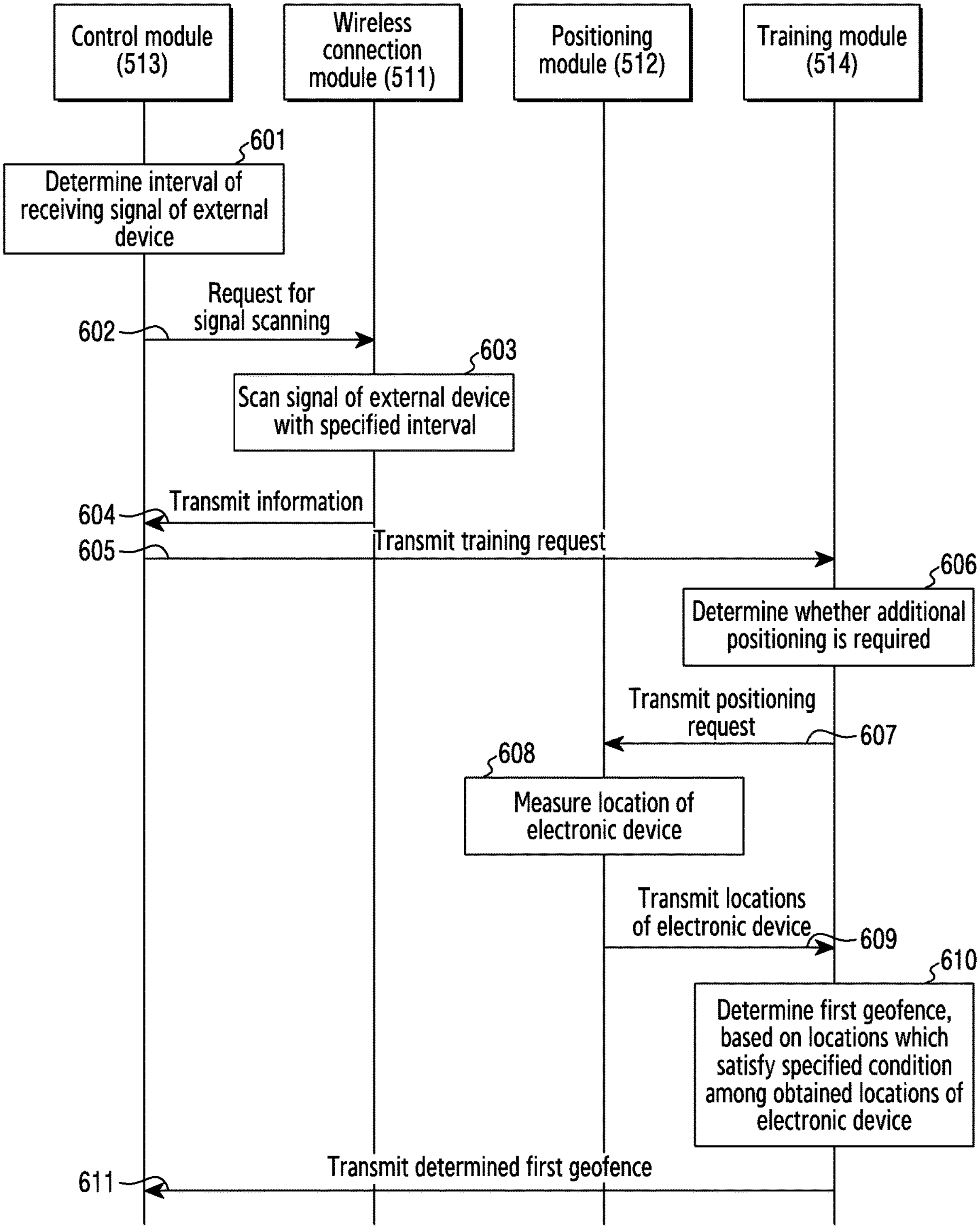
FIG. 6 illustrates an operation of determining a geofence, based on a location of an electronic device, measured in response to receiving a signal from an external device according to an embodiment of the disclosure.

FIG. 6 illustrates an operation of determining a geofence, based on a location of an electronic device, measured in response to receiving a signal from an external device according to an embodiment of the disclosure.

Referring to FIG. 6, in operation 601, the control module 513 according to an embodiment may determine an interval of receiving a signal (e.g., an advertising packet) of the first external device 401. The specified interval may mean an interval of scanning the signal of the first external device 401. In an embodiment, in operation 602, the control module 513 may request the wireless connection module 511 to scan the signal with the specified interval. In an embodiment, the signal of the first external device 401 may correspond to a signal of various communication schemes. For example, the signal of the first external device 401 may correspond to an advertising packet of Bluetooth Low Energy (BLE). As another example, the signal of the first external device 401 may correspond to an advertising packet of Wi-Fi. In an embodiment, the first external device 401 scanned by the control module 513 may be a device which supports a variety of wireless communication. For example, the first external device 401 may be a device which supports at least one of BLE, Bluetooth (BT), Near Field Communication (NFC), Magnetic Secure Transmission (MST), Radio Frequency Identification (RFID), Wi-Fi, cellular communication.

According to an embodiment, in operation 603, the wireless connection module 511 may scan a signal of the first external device 401 with a specified interval in response to a scan request. In operation 604, the wireless connection module 511 may transmit information to the control module 513 when a signal is received from the first external device 401. The information may include a notification indicating that an advertising packet of the first external device 401 is received and/or information of the first external device 401.

According to an embodiment, in operation 605, the control module 513 may transmit a training request to the training module 514 upon receiving the information from the wireless connection module 511. In an embodiment, in operation 606, the training module 514 may determine whether additional positioning is required in response to receiving the training request. For example, the training module 514 may determine that the additional positioning is not required when the number of locations obtained in advance before receiving the training request is greater than or equal to a specified number. As another example, the training module 514 may determine that the additional positioning is required when the number of locations obtained in advance before receiving the training request is less than the specified number. In an embodiment, in operation 607, the control module 513 may transmit a positioning request to the positioning module 512 upon determining that the additional positioning is required. For example, the specified number may mean the smallest number of locations required for the training module 514 to determine the geofence. However, the specified number is not limited thereto, and may have various meanings. For example, the specified number may correspond to a number set by the user.

According to an embodiment, in operation 608, the positioning module 512 may measure the location of the electronic device 101 in response to receiving the positioning request. For example, the positioning module 512 may obtain latitude and longitude of the electronic device 101 by using a positioning system (e.g., a GNSS system). As another example, even if the positioning system is not used directly, the positioning module 512 may identify the location of the electronic device 101 by using latitude and longitude information obtained by another application. In an embodiment, in operation 609, the positioning module 512 may transmit the identified locations of the electronic device 101 to the training module 514.

According to an embodiment, in operation 610, the training module 514 may determine a first geofence, based on locations which satisfy a specified condition among the obtained locations of the electronic device 101. For example, the specified condition may mean a condition in which a timing of measuring the location of the electronic device 101 and a timing of determining the first geofence are not different by more than a specified time. In an embodiment, in operation 611, the training module 514 may transmit the determined first geofence to the control module 513. According to an embodiment, the control module 513 may transfer the obtained first geofence to the application layer 310.

Figure 7A:
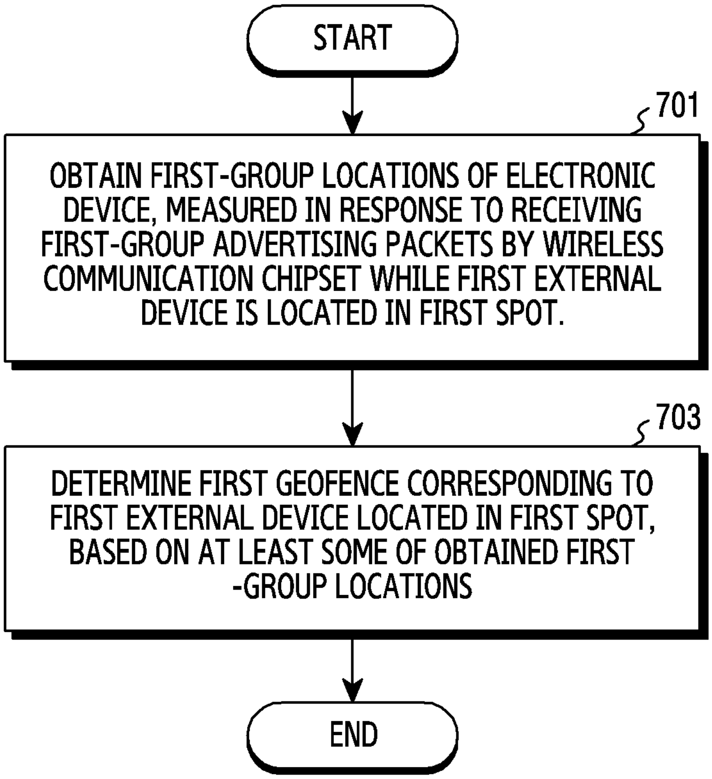
FIG. 7A illustrates an operation in which an electronic device determines a geofence according to an embodiment of the disclosure.

FIG. 7A illustrates an operation in which an electronic device determines a geofence according to an embodiment of the disclosure.

Referring to FIG. 7A, in operation 701, the application processor 210 according to an embodiment may obtain first locations of the electronic device 101, measured in response to receiving a plurality of first advertising packets by the wireless communication chipset 220 while the first external device 401 is located in a first point.

For example, the wireless communication chipset 220 may receive the plurality of first advertising packets broadcast by the first external device 401 located in the first point. The application processor 210 may measure a location of the electronic device 101 by using the location tracking circuit 230 whenever the wireless communication chipset 220 receives the plurality of first advertising packets. As a result, the application processor 210 may obtain first locations of the electronic device 101, corresponding to a timing at which the first advertising packets are received.

In an embodiment, the application processor 210 which is in a low-power state may be released from the low-power state when the wireless communication chipset 220 receives the first advertising packets of the first external device 401. For example, the measured location of the electronic device 101 may mean a location measured through a location provider (e.g., a GNSS system (e.g., a GPS system), a WPS system, a Network Location Provider (NLP) system, or a CPS system). As another example, the measured location of the electronic device 101 may correspond to a location of the electronic device 101, received indirectly from another application.

In an embodiment, the first external device 401 may be a device which supports short-range communication (e.g., Bluetooth communication) directly input by the user to the electronic device 101. As another example, the first external device 401 may be a device from which the electronic device 101 has received advertising packets more than a specified number of times. That is, even if the user does not input the first external device 401 as a device which is a target of the short-range communication connection is to be established, the electronic device 101 may receive the advertising packets of the first external device 401 more than the specified number of times while a signal of the external device is scanned via the wireless communication chipset 220. In this case, the electronic device 101 may identify the first external device 401 as a stationary or mobile device which supports short-range communication. In addition, the electronic device 101 may identify the first external device 401 as a device which needs to determine the geofence corresponding to the first external device 401. For example, the electronic device 101 may receive more than the specified number of times the advertising packets of the first external device 401 which is not input by the user to the electronic device 101 as the target of the communication. In an example, the electronic device 101 may identify the first external device 401 as the device which needs to determine the geofence, and may determine the first geofence, based on first locations measured in response to receiving the first advertising packets from the first external device 401. When the second geofence determined based on second locations measured in response to receiving second advertising packets from the first external device 401 after a specified period of time has substantially no difference with a center point and radius of the first geofence, the electronic device 101 may identify the first external device 401 as the stationary device. That is, when the center points of the geofences corresponding to the first external device 401, learned by the electronic device 101, converge to one point, and the radii of the geofences converge to a value less than or equal to a specified value, the electronic device 101 may identify the first external device 401 as the stationary device. As another example, when the center points of the geofences corresponding to the first external device 401, learned by the electronic device 101, do not converge to one point and when the radii of the geofences do not converge to the value less than or equal to the specified value, the electronic device 101 may identify the first external device 401 as the mobile device.

According to an embodiment, in operation 703, the application processor 210 may determine the first geofence corresponding to the first external device 401 located in a first point, based on at least some of the obtained first locations. For example, the application processor 210 may determine the first geofence, based on third locations excluding second locations satisfying a specified condition from the obtained first locations. For example, the specified condition may mean a case where a result of comparing a first timing at which the location of the electronic device 101 is measured and a second timing at which the first geofence is determined differs by more than a specified time.

According to an embodiment, upon determining the first geofence, the application processor 210 may display information on the first geofence on a display. For example, the application processor 210 may display on the display 250 an execution screen of an application related to the geofence. The execution screen may include at least one user interface for displaying information on the determined first geofence. In an example, the user may modify, or newly input, information on the first geofence displayed on the at least one user interface through the user input.

According to an embodiment, when a location (e.g., latitude and longitude) of the first point of the first external device 401 has reliability and/or accuracy greater than a specified level, the application processor 210 may provide the user with a location-based service by using the first geofence. For example, when the location of the first external device 401, input to the electronic device 101, has the reliability and/or accuracy greater than the specified level, the application processor 210 may identify that an advertising packet is not received from the first external device 401 until the advertising packet is received from the first external device 401 after the first timing. In an embodiment, the application processor 210 may identify that the electronic device 101 located outside the first geofence enters into the first geofence at the first timing, based on receiving the advertising packet. In addition, since the electronic device 101 enters into the first geofence, the application processor 210 may identify that the electronic device 101 is located at a location corresponding to the first point of the first external device 401 without additional positioning via the location tracking circuit 230. As a result, the application processor 210 may estimate or identify the location of the electronic device 101, based on whether a short-range communication connection (e.g., Bluetooth communication) is established with the first external device 401 without additional positioning via the location tracking circuit 230. In addition, the application processor 210 may provide various services (e.g., smart tags), based on the identified location of the electronic device 101.

The embodiment of FIG. 7A and the embodiment of FIG. 6 may be combined in the disclosure. For example, the operation 701 of FIG. 7A may be performed after the operation 609 of FIG. 6C, and the operation 703 of FIG. 7A may correspond to the operation 610 of FIG. 6C. However, this is only an example, and the disclosure is not limited to the aforementioned correspondence relation.

Figure 7B:
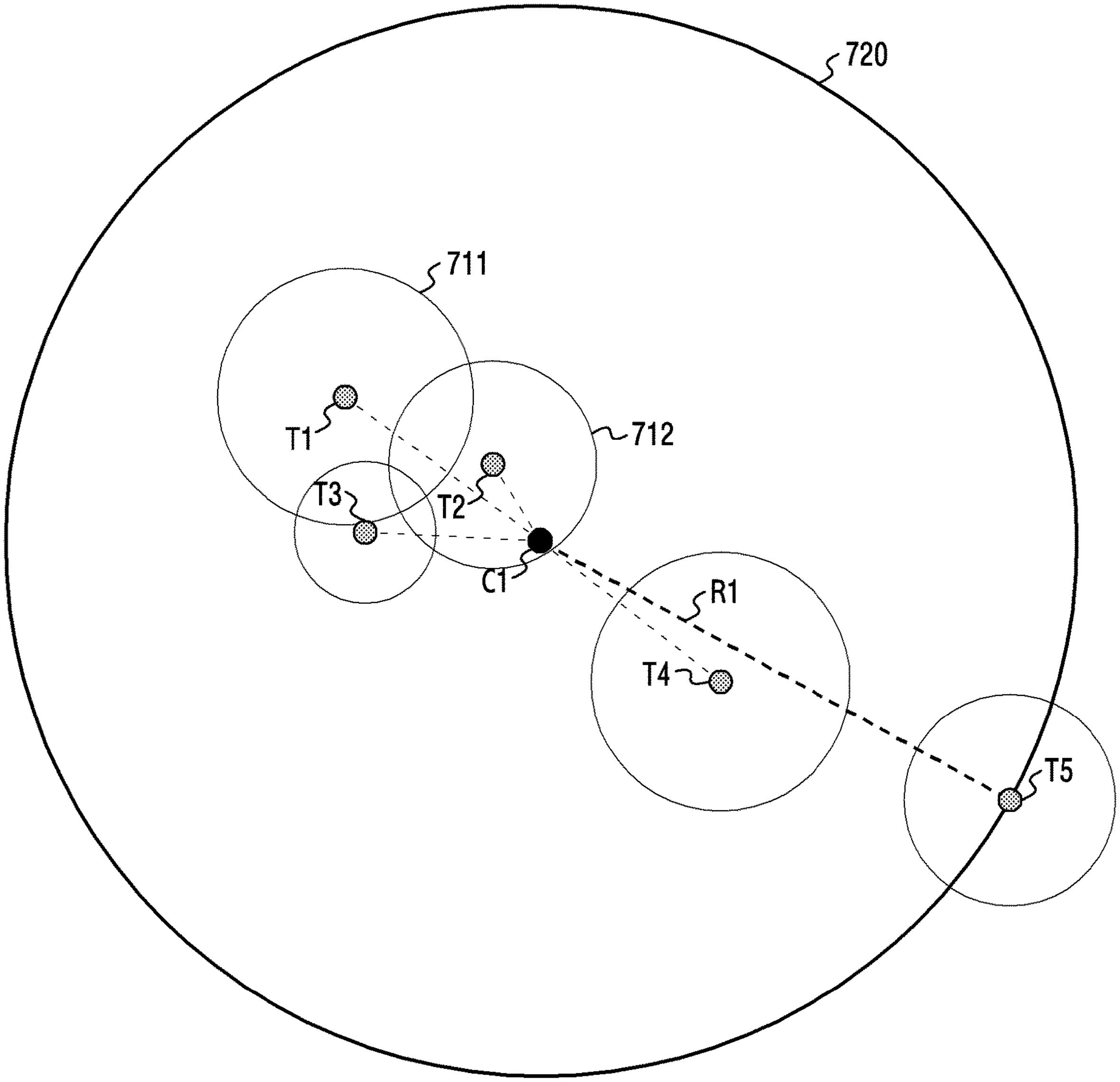
FIG. 7B illustrates an example in which an application processor determines a first geofence, based on obtained first locations according to an embodiment of the disclosure.
Figure 7C:
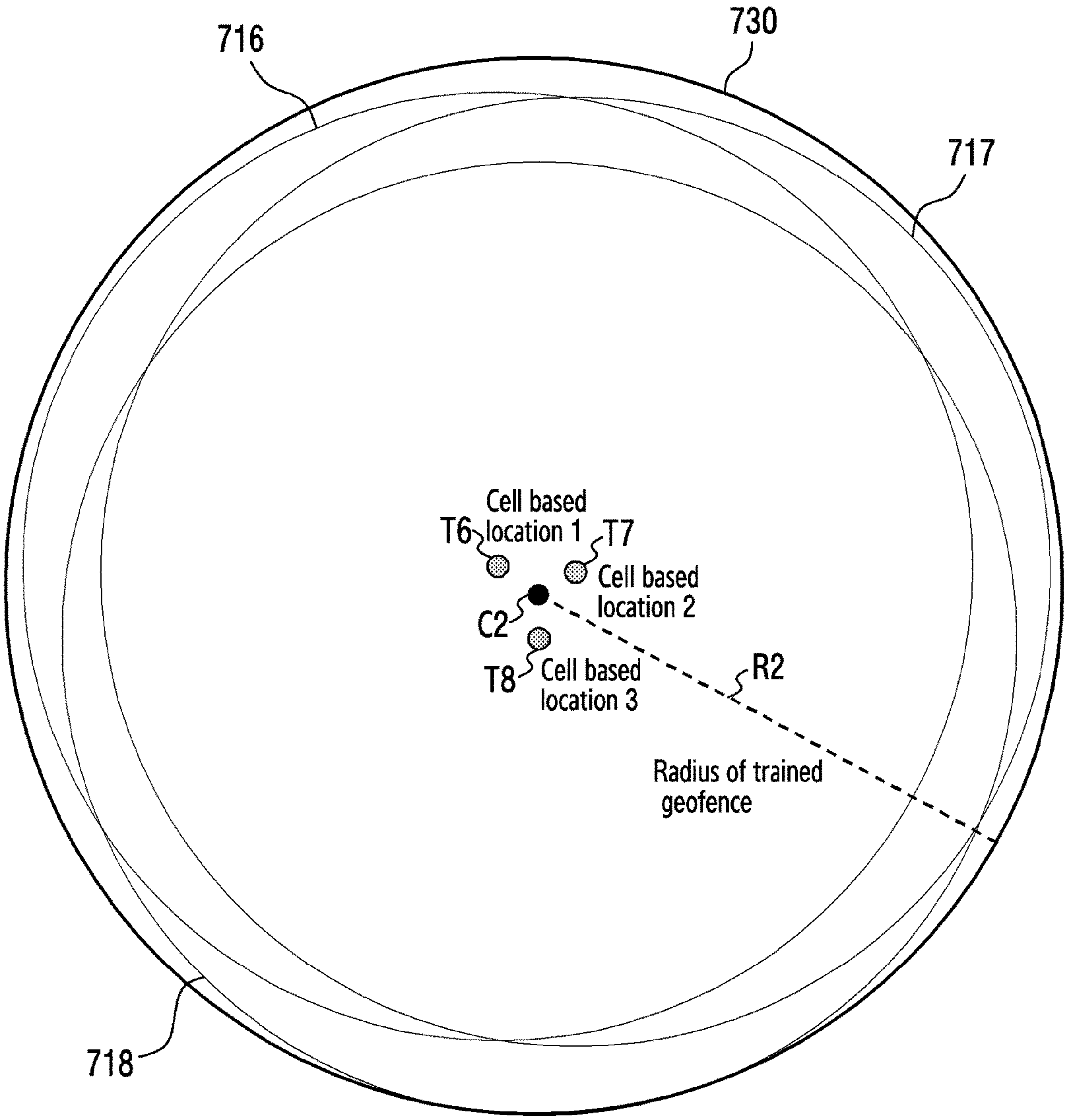
FIG. 7C illustrates an example in which an application processor determines a first geofence, based on obtained second locations according to an embodiment of the disclosure.

Hereinafter, FIGS. 7B and 7C illustrate a specific example in which the application processor 210 determines a geofence, based on obtained locations.

FIG. 7B illustrates an example in which an application processor determines a first geofence, based on obtained first locations according to an embodiment of the disclosure.

Referring to FIG. 7B, the application processor 210 according to an embodiment may identify first locations of the electronic device 101 in response to receiving a plurality of first advertising packets from the first external device 401. For example, upon receiving a first advertising packet, the application processor 210 may identify a first location T1 via the location tracking circuit 230. In an embodiment, the identified first location T1 may have an error in a specified range, and the application processor 210 may identify a first range 711 of the first location T1 by considering the error. As another example, upon receiving a second advertising packet, the application processor 210 may identify a second location T2 via the location tracking circuit 230. In an embodiment, the application processor 210 may identify a second range 712 of the second location T2 by considering the error. Likewise, upon receiving a third advertising packet, a fourth advertising packet, and/or a fifth advertising packet, the application processor 210 may identify a third location T3, a fourth location T4, and/or a fifth location T5, respectively, via the location tracking circuit 230.

According to an embodiment, the application processor 210 may determine a first geofence 720, based on the identified plurality of first locations T1, T2, T3, T4, and T5. For example, the application processor 210 may determine an average point of latitude and longitude of the identified plurality of first locations T1, T2, T3, T4, and T5 as a first center point C1 of the first geofence 720. As another example, the application processor 210 may determine a first distance R1 between the first center point C1 and a location (e.g., the fifth location T5) farthest from the identified plurality of first locations T1, T2, T3, T4, and T5 as a first radius of the first geofence 720.

According to an embodiment, upon determining the first geofence 720, the application processor 210 may identify a name of a space corresponding to the first geofence 720. For example, after determining the first geofence 720, the application processor 210 may display an execution screen of an application associated with the geofence on at least part of the display 250. In an example, a user may input the name of the space corresponding to the first geofence 720 through a user input on the execution screen, and accordingly, the application processor 210 may identify the name of the space corresponding to the first geofence 720. As another example, the execution screen of the application associated with the geofence may include a user interface for identifying whether the space corresponding to the first geofence 720 is a main room of a house, and the user may identify whether the space corresponding to the first geofence 720 is the main room of the house through the user input. According to an embodiment, the application processor 210 may determine whether it is an environment where the first geofence 720 is meaningful to the user by identifying the name of the space corresponding to the first geofence 720 through the user input.

Although it is illustrated in FIG. 7B that the determined first geofence 720 has a circular shape having the first distance R1 with respect to the first center point C1, this is only an example, and the first geofence 720 may have various shapes in another embodiment. For example, the first geofence 720 may have a square shape. As another example, the first geofence 720 may have a closed curve shape.

According to an embodiment, the application processor 210 may determine a geofence (e.g., the first geofence 720) in various manners. For example, although the first radius of the first geofence 720 is determined as a distance between the first center point C1 and a location farthest from the first center point C1 among the first locations T1, T2, T3, T4, and T5 in FIG. 7B, this is only an example, and the radius of the geofence may be determined in various manners. Hereinafter, an embodiment in which the application processor 210 determines the radius of the geofence in a manner different from that described in FIG. 7B is described with reference to FIG. 7C.

FIG. 7C illustrates an example in which an application processor determines a first geofence, based on obtained second locations according to an embodiment of the disclosure.

Referring to FIG. 7C, the application processor 210 according to an embodiment may identify second locations of the electronic device 101 in response to receiving a plurality of second advertising packets from the first external device 401. For example, upon receiving a sixth advertising packet among the plurality of second advertising packets, the application processor 210 may identify a sixth T6 via the location tracking circuit 230. In an embodiment, the identified sixth location T6 may have an error in a specified range, and the application processor 210 may identify a sixth range 716 of the sixth location T6 by considering the error. As another example, upon receiving a seventh advertising packet, the application processor 210 may identify a seventh location T7 via the location tracking circuit 230. In an embodiment, the application processor 210 may identify a seventh range 717 of the seventh location T7 by considering the error. As another example, upon receiving an eighth advertising packet, the application processor 210 may identify an eighth location T8 via the location tracking circuit 230. In an example, the application processor 210 may identify an eighth range 718 of the eighth location T8 by considering the error.

According to an embodiment, the application processor 210 may determine a second geofence 730, based on the identified plurality of second locations T6, T7, and T8. For example, the application processor 210 may determine an average point of latitude and longitude of the identified plurality of second locations T6, T7, and T8 as a second center point C2 of the second geofence 730. As another example, the application processor 210 may determine a second distance R2 which is a farthest distance among distances from the second center point C2 to the fifth range 715, the sixth range 716, and the seventh range 717 as a second radius of the second geofence 730.

Although it is illustrated in FIG. 7C that the determined second geofence 730 has a circular shape having the second distance R2 with respect to the second center point C2, this is only an example, and the second geofence 730 may have various shapes in another embodiment. For example, the second geofence 730 may have a square shape. As another example, the second geofence 730 may have a closed curve shape.

Figure 8:
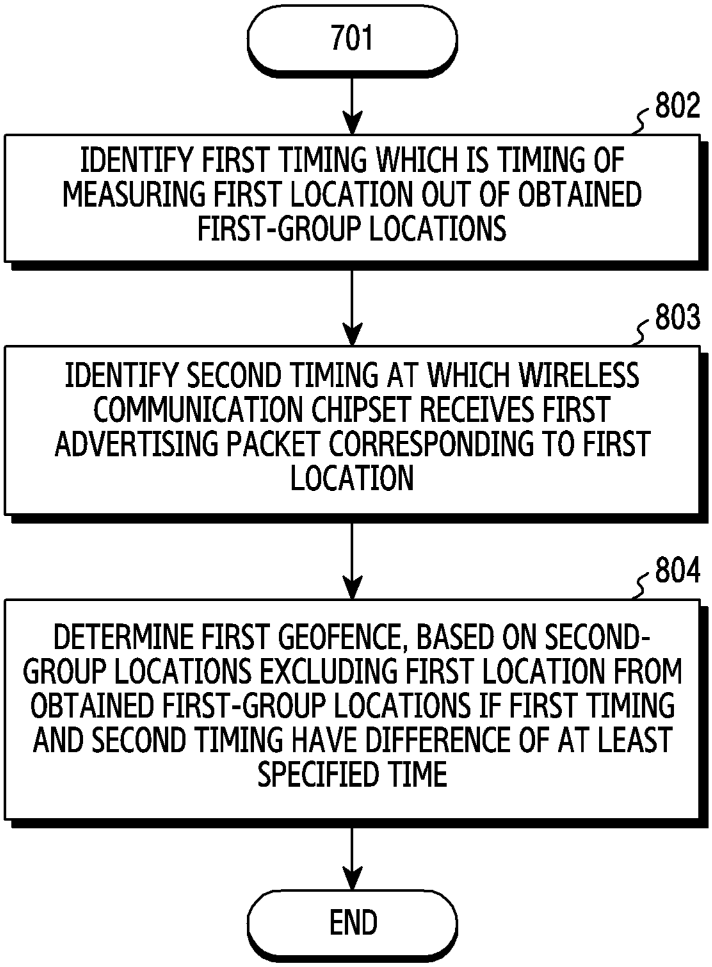
FIG. 8 illustrates an operation in which an application processor determines a first geofence, based on second locations excluding a first location which satisfies a specified condition from obtained first locations according to an embodiment of the disclosure.

FIG. 8 illustrates an operation in which an application processor determines a first geofence, based on second locations excluding a first location which satisfies a specified condition from obtained first locations according to an embodiment of the disclosure.

Referring to FIG. 8, in operation 802, the application processor 210 according to an embodiment may identify a first timing which is a timing of measuring a first location among obtained first locations. For example, the application processor 210 may measure a first location of the electronic device 101 via the location tracking circuit 230 in response to receiving a first advertising signal. In an example, the application processor 210 may identify a timing of measuring the first location as a first timing.

In operation 803, the application processor 210 according to an embodiment may identify a second timing at which the wireless communication chipset 220 receives the first advertising packet corresponding to the first location. For example, the wireless communication chipset 220 may scan an advertising packet transmitted by the first external device 401 with a specified interval, and the wireless communication chipset 220 may receive the first advertising packet of the first external device 401. The application processor 210 may receive from the wireless communication chipset 220 the second timing at which the wireless communication chipset 220 receives the first advertising packet.

In operation 804, if the first timing and the second timing have a difference of at least a specified time, the application processor 210 according to an embodiment may determine a first geofence (e.g., the first geofence 720 of FIG. 7B), based on second locations excluding the first location from the obtained first locations.

The application processor 210 according to an embodiment may determine the first geofence, based on the second locations excluding the first location, thereby increasing accuracy and/or reliability of the first geofence. For example, if the application processor 210 determines the first geofence, based on the first locations including the first location, the determined first geofence may include an error due to the difference between the first timing which is a measurement timing and the second timing which is a reception timing. On the other hand, if the application processor 210 according to an embodiment determines the first geofence, based on the second locations excluding the first location from the first locations, the error of the first geofence, caused by the difference between the first timing and the second timing, may be prevented.

For example, when there is a difference between the first timing and the second timing, a size of a first range (e.g., the first range 711 of FIG. 7B) corresponding to the measured location (e.g., the first location T1 of FIG. 7B) of the electronic device 101 may increase. As a result, a first radius of the first geofence may increase along with an increase in a radius of the first range, and accuracy and/or reliability of the first geofence may decrease.

The embodiment of FIG. 8 of the disclosure may be combined with each of the embodiment of FIG. 6 and the embodiment of FIG. 7A. For example, the operations 802 to 804 of FIG. 8 may be operations which identify locations satisfying the specified condition of the operation 610 of FIG. 6 and determine the first geofence. However, this is only an example, and a correspondence relation between FIGS. 8 and 6 is not limited thereto.

Figure 9:
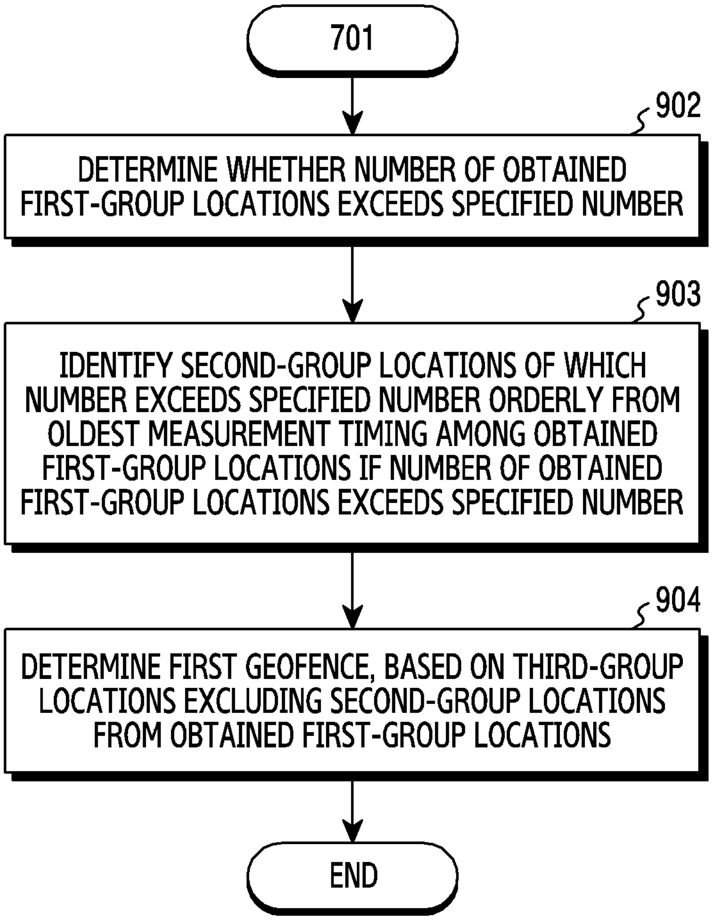
FIG. 9 illustrates an operation in which an application processor determines a first geofence, based on third locations excluding second locations having old measurement timings from obtained first locations according to an embodiment of the disclosure.

FIG. 9 illustrates an operation in which an application processor determines a first geofence, based on third locations excluding second locations having old measurement timings from obtained first locations according to an embodiment of the disclosure.

Referring to FIG. 9, in operation 902, the application processor 210 according to an embodiment may determine whether the number of obtained first locations exceeds a specified number. For example, the application processor 210 may determine whether the number of first locations measured using the location tracking circuit 230 in response to a plurality of advertising signals received from the first external device 401 exceeds the specified number. In an embodiment, the specified number may mean a number required by the application processor 210 to determine a first geofence. For example, the application processor 210 may determine whether the number N of obtained locations exceeds M which is the number of locations required to determine the first geofence.

According to an embodiment, in operation 903, if the number of the obtained first locations exceeds a specified number, the application processor 210 may identify second locations with a number exceeding the specified number in order of an oldest measurement timing among the obtained first locations. For example, if N exceeds M, the application processor 210 may identify (N-M) second locations orderly from the oldest measurement timings among the obtained first locations.

According to an embodiment, in operation 904, the application processor 210 may determine the first geofence, based on third locations excluding the second locations from the obtained first locations. For example, the application processor 210 may determine the first geofence, based on M third locations excluding (N-M) second locations from N first locations. In an embodiment, the application processor 210 may store the third locations in a memory (e.g., the memory 130 of FIG. 1).

According to an embodiment, since the application processor 210 determines the first geofence, based on the third locations excluding the second locations, the electronic device 101 may improve reliability and/or accuracy of the determined first geofence. For example, if the application processor 210 determines the first geofence, based on all of the first locations without consideration of a measurement timing, the reliability and/or accuracy of the first geofence may decrease. For example, in a case where the first geofence is determined by considering up to the measured second locations when the first external device 401 is located in a first slot even if the first external device 401 located in the first point moves to a second point, the reliability and/or accuracy of the first geofence may decrease. On the other hand, in a case where the application processor 210 according to an embodiment determines the first geofence, based on the third locations excluding the second locations from the first locations, the electronic device 101 may ensure relatively high reliability and/or accuracy of the first geofence.

The embodiment of FIG. 9 of the disclosure may be combined with each of the embodiment of FIG. 6, the embodiment of FIG. 7A, and the embodiment of FIG. 8. For example, the operations 902 to 904 of FIG. 9 may be the operation 610 of FIG. 6 which identifies locations satisfying the specified condition and determines a first geofence. However, this is only an example, and a correspondence relation is not limited thereto.

Figure 10:
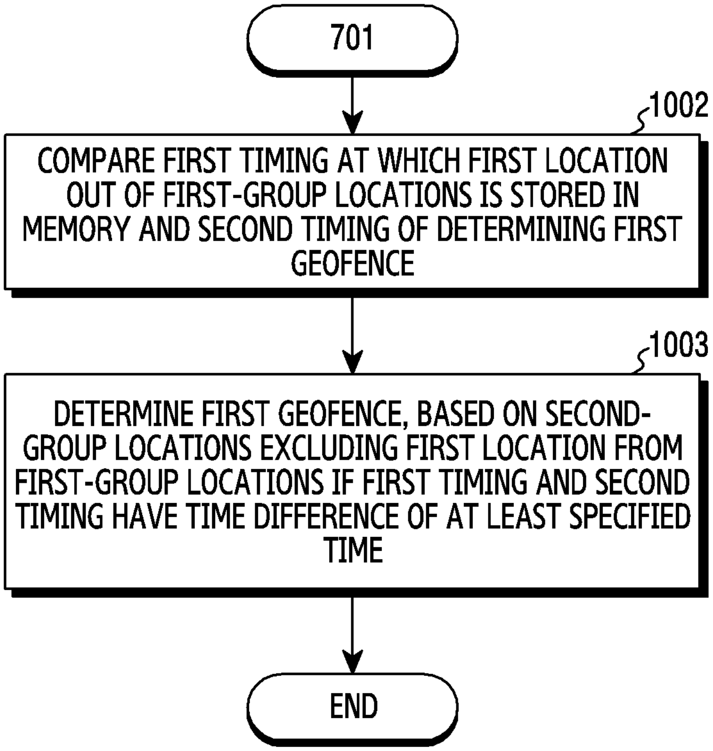
FIG. 10 illustrates an operation of determining a first geofence, based on second locations excluding a first location from first locations by comparing a first timing stored in a memory and a second timing for determining the first geofence according to an embodiment of the disclosure.

FIG. 10 illustrates an operation of determining a first geofence, based on second locations excluding a first location from first locations by comparing a first timing stored in a memory and a second timing for determining the first geofence according to an embodiment of the disclosure.

Referring to FIG. 10, in operation 1002, the application processor 210 according to an embodiment may compare the first timing at which a first location among first locations is stored in the memory 130 and a second timing of determining a first geofence. For example, the application processor 210 may measure the first location of the electronic device 101 in response to receiving a first advertising signal, and may store the measured first location in the memory 130. The application processor 210 may identify the first timing at which the first location is stored in the memory 130. In an embodiment, the application processor 210 may identify the second timing of determining the first geofence. For instance, the second timing at which the application processor 210 determines the first geofence may mean a time of completing measurement on a specified number of locations. In an embodiment, the application processor 210 may compare the first timing and the second timing.

According to an embodiment, in operation 1003, if the first timing and the second timing have a time difference of at least a specified time, the application processor 210 may determine the first geofence, based on second locations excluding the first location from the first locations.

According to an embodiment, the application processor 210 may determine the first geofence, based on the second locations excluding the first location, thereby increasing the reliability and/or accuracy of the first geofence.

The embodiment of FIG. 10 of the disclosure may be combined with each of the embodiment of FIG. 6, the embodiment of FIG. 7A, the embodiment of FIG. 8, and the embodiment of FIG. 9. For example, the operations 1002 and 1003 of FIG. 10 may be operations which identify locations satisfying the specified condition of the operation 610 of FIG. 6 and determine the first geofence. However, this is only an example, and a correspondence relation is not limited thereto.

Figure 11:
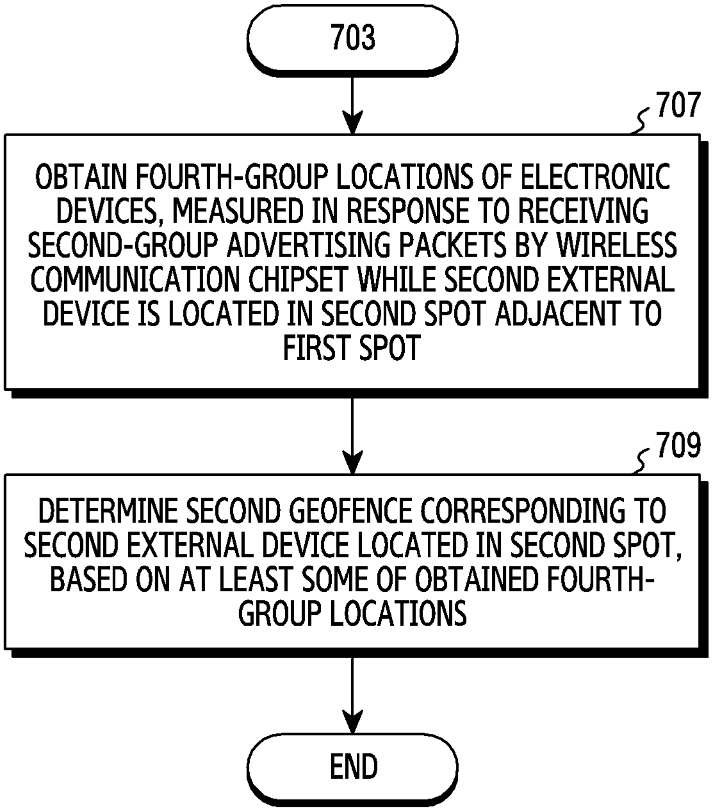
FIG. 11 illustrates an operation of determining a second geofence corresponding to a second external device after determining a first geofence of a first external device according to an embodiment of the disclosure.

FIG. 11 illustrates an operation of determining a second geofence corresponding to a second external device after determining a first geofence of a first external device according to an embodiment of the disclosure.

Referring to FIG. 11, in operation 707, the application processor 210 according to an embodiment may obtain fourth locations of electronic devices, measured in response to receiving a plurality of second advertising packets by the wireless communication chipset 220 while the second external device is located in a second point adjacent to a first point. For example, the wireless communication chipset 220 may receive the plurality of second advertising packets broadcast by the second external device located in the second point. The application processor 210 may measure a location of the electronic device 101 by using the location tracking circuit 230 whenever the wireless communication chipset 220 receives the plurality of second advertising packets. As a result, the application processor 210 may obtain the fourth locations of the electronic device 101, corresponding to respective timings of receiving the second advertising packets.

According to an embodiment, in operation 709, the application processor 210 may determine a second geofence corresponding to the second external device located in the second point, based on at least some of the obtained fourth locations. For example, the application processor 210 may determine the second geofence, based on sixth locations excluding fifth locations satisfying a specified condition from the obtained fourth locations. Hereinafter, an example of the first geofence corresponding to the first external device 401 and the second geofence corresponding to the second geofence is described in detail in FIG. 12.

The embodiment of FIG. 11 of the disclosure may be combined with each of the embodiment of FIG. 6, the embodiment of FIG. 7A, the embodiment of FIG. 8, the embodiment of FIG. 9, and the embodiment of FIG. 10. For example, the operation of FIG. 11 may be performed after the operation 611 of FIG. 6. As another example, the operation of FIG. 11 may be performed after the operation 703 of FIG. 7A. However, this is only an example, and a correspondence relation is not limited thereto.

Figure 12:
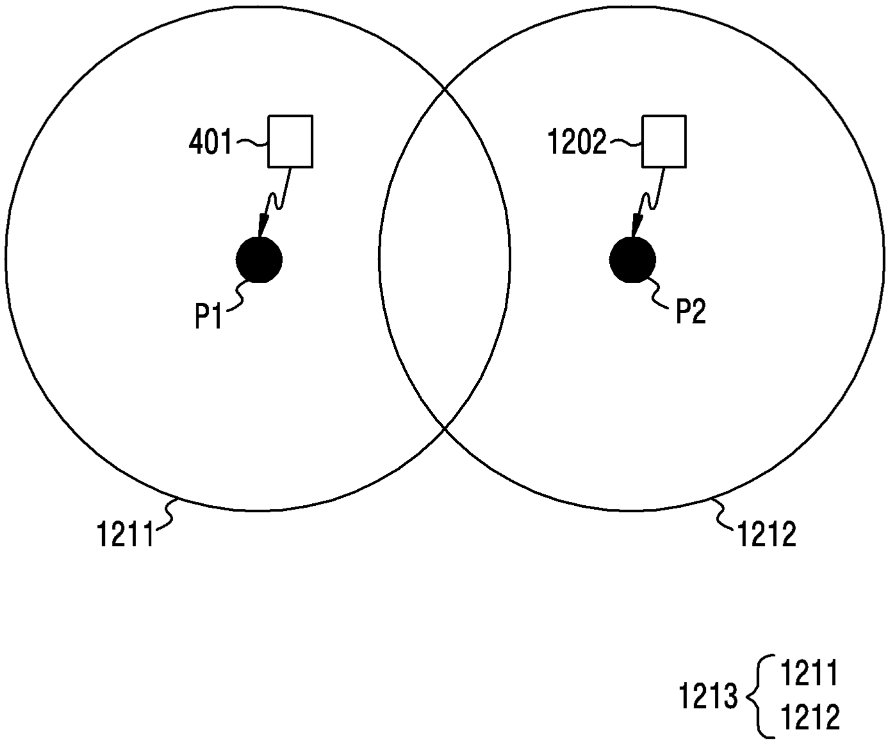
FIG. 12 illustrates a first geofence corresponding to a first external device and a second geofence corresponding to a second external device according to an embodiment of the disclosure.

FIG. 12 illustrates a first geofence corresponding to a first external device and a second geofence corresponding to a second external device according to an embodiment of the disclosure.

Referring to FIG. 12, according to an embodiment, the first external device 401 may be located in a first point P1. In an embodiment, the application processor 210 may determine a first geofence 1211, based on at least some of measured first locations in response to receiving a plurality of first advertising signals from the first external device 401.

According to an embodiment, a second external device 1202 may be located in a second point P2. In an embodiment, the application processor 210 may determine a second geofence 1212, based on at least some of second locations measured in response to receiving the plurality of second advertising signals from the second external device 1202. In an embodiment, the second point P2 may correspond to a point adjacent to the first point.

According to an embodiment, the application processor 210 may identify the first geofence 1211 and the second geofence 1212 as independent distinctive geofences.

According to an embodiment, the application processor 210 may identify the first geofence 1211 and the second geofence 1212 as one geofence. For example, the application processor 210 may identify the first geofence 1211 and the second geofence 1212 as a single third geofence 1213.

Therefore, the application processor 210 may identify the plurality of geofences as one geofence to extend a range of the geofence, and may define one space. For example, the first external device 401 may correspond to a television, and the second external device 1202 may correspond to a refrigerator. In an example, the application processor 210 may identify the first geofence 1211 corresponding to the television and the second geofence 1212 corresponding to the refrigerator as the single third geofence 1213. For example, the third geofence 1213 may substantially mean inside a house.

As another example, the first external device 401 may correspond to the television, and the second external device 1202 may correspond to an air conditioner. In an example, the application processor 210 may identify the first geofence 1211 corresponding to the television and the second geofence 1212 corresponding to the air conditioner as the single third geofence 1213. In this case, the third geofence 1213 may correspond to a main room. Likewise, the application processor 210 may identify a fourth geofence of a third external device corresponding to the refrigerator and a fifth geofence of a fourth external device corresponding to a Bluetooth speaker as a single sixth geofence. In this case, the sixth geofence may correspond to a kitchen.

As a result, the application processor 210 may aggregate a plurality of external devices inside the house as a single group, may determine whether the user is located inside the house, based on whether the user is located in a geofence corresponding to the single group, and may provide the user with a service, based on the determination.

In addition, the application processor 210 may aggregate the first external device 401 and the second external device 1202 as a first sub-group, and may provide the user with a first service, based on a geofence corresponding to the first sub-group. Likewise, the application processor 210 may aggregate the third external device and the fourth external device as a second sub-group, and may provide the user with a second service, based on a geofence corresponding to the second sub-group. In this case, the first service may differ from the second service. For example, the first service may be a service associated with a main room corresponding to the first sub-group, and the second service may be a service associated with a kitchen corresponding to the second sub-group.

According to an embodiment, even when a plurality of geofences are identified as a single geofence, the application processor 210 may provide the user with a service by utilizing each of the plurality of geofences. For example, when the user enters into the third geofence 1213 corresponding to the inside the house, the application processor 210 may provide the user with a music service via the first external device 401 (e.g., a device including a speaker) and/or the second external device 1202 (e.g., a device including a speaker). In an example, when the user enters into the third geofence 1213 and is located inside the first geofence 1211 in the third geofence 1213, the application processor 210 may provide the user with the music service via the first external device 401. In addition, when the user enters into the third geofence 1213 and is located inside the second geofence 1212 in the third geofence 1213, the application processor 210 may provide the user with the music service via the second external device 1202.

According to an embodiment, the application processor 210 may divide a geofence identified as one entity into separate geofences. For example, the second external device 1202 located in the second point P2 may move to a third point not adjacent to the first point P1 in which the first external device 401 is located. In an embodiment, as the second external device 1202 moves to the third point, the application processor 210 may divide the third geofence 1213 recognized as being corresponding to one space into the first geofence 1211 corresponding to the first external device 401 located in the first point P1 and the fourth geofence corresponding to the second external device 1202 located in the third point. Each of the divided first geofence 1211 and fourth geofence may be utilized as a separate geofence.

For example, the application processor 210 may identify the first geofence 1211 of the first external device 401 located in the main room and the second geofence 1212 of the second external device 1202 located in the main room as the single third geofence 1213. In an example, the third geofence 1213 may substantially correspond to a space called the main room. In an embodiment, the second external device 1202 located in the main room may move to a space outside a house, and as the second external device 1202 moves to the space outside the house, the application processor 210 may divide the third geofence 1213 into the first geofence 1211 corresponding to the first external device 401 located in the main room and the fourth geofence corresponding to the second external device 1202 located in the space outside the house. Each of the divided first geofence 1211 and fourth geofence may be utilized as a separate geofence.

Figure 13:
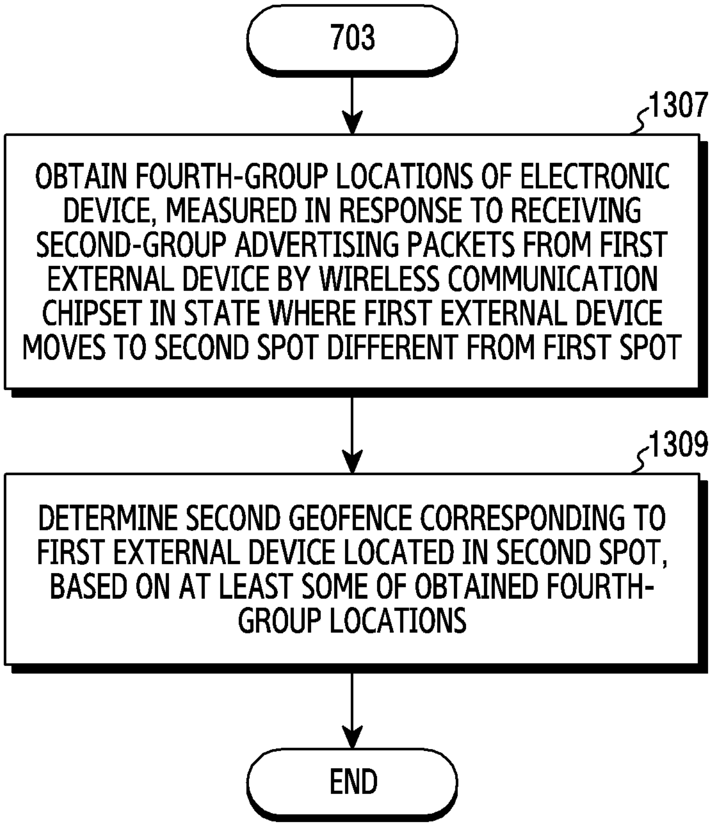
FIG. 13 illustrates an operation in which an application processor determines a second geofence corresponding to a first external device located in a second point in a state where the first external device moves to the second point different from a first point according to an embodiment of the disclosure.

FIG. 13 illustrates an operation in which an application processor determines a second geofence corresponding to a first external device located in a second point in a state where the first external device moves to the second point different from a first point according to an embodiment of the disclosure.

Referring to FIG. 13, in operate 1307, the application processor 210 according to an embodiment may obtain fourth locations of the electronic device 101, measured in response to receiving a plurality of second advertising packets from the first external device 401 by the wireless communication chipset 220 in a state where the first external device 401 moves to a second point different from a first point. For example, the wireless communication chipset 220 may receive the plurality of second advertising packets broadcast by the first external device 401 located in the second point in the state where the first external device 401 moves to the second point different from the first point. In an embodiment, the application processor 210 may measure the location of the electronic device 101 by using the location tracking circuit 230 whenever the wireless communication chipset 220 receives the plurality of second advertising packets. As a result, the application processor 210 may obtain the fourth locations of the electronic device 101 corresponding to a timing at which the second advertising packets are received.

According to an embodiment, in operation 1309, the application processor 210 may determine a second geofence corresponding to the first external device 401 located in the second point, based on at least some of the obtained fourth locations. For example, the application processor 210 may determine the first geofence, based on sixth locations excluding fifth locations satisfying a specified condition from the obtained fourth locations. The specified condition may mean a case where a result of comparing the first timing at which the location of the electronic device 101 is measured and the second timing at which the second geofence is determined differs by more than a specified time.

As another example, if the number of the obtained fourth locations exceeds a specified number, the application processor 210 may identify sixth locations with a number exceeding the specified number in order of from the oldest measurement timing among the fifth locations. In an example, the application processor 210 may determine the second geofence, based on the fourth locations excluding the third locations from the second locations.

As another example, the application processor 210 may compare a first timing at which a first location among the fourth locations is stored in the memory and a second timing at which the application processor 210 determines the second geofence. In an example, the application processor 210 may determine the second geofence, based on sixth locations excluding the first location from the fifth locations if a difference between the first timing and the second timing is greater than or equal to a specified time.

According to an embodiment, the determining of the second geofence by the application processor 210 may mean substantially updating the first geofence to the second geofence.

The embodiment of FIG. 13 of the disclosure may be combined with each of the embodiment of FIG. 6, the embodiment of FIG. 7A, the embodiment of FIG. 8, the embodiment of FIG. 9, the embodiment of FIG. 10, and the embodiment of FIG. 11. For example, the operation of FIG. 13 may be performed after the operation 611 of FIG. 6. As another example, the operation of FIG. 11 may be performed after the operation 703 of FIG. 7A. However, this is only an example, and a correspondence relation is not limited thereto.

Hereinafter, an example in which the application processor 210 determines a second geofence with movement of the first external device 401 from a first location to a second location is described with reference to FIG. 14.

Figure 14:
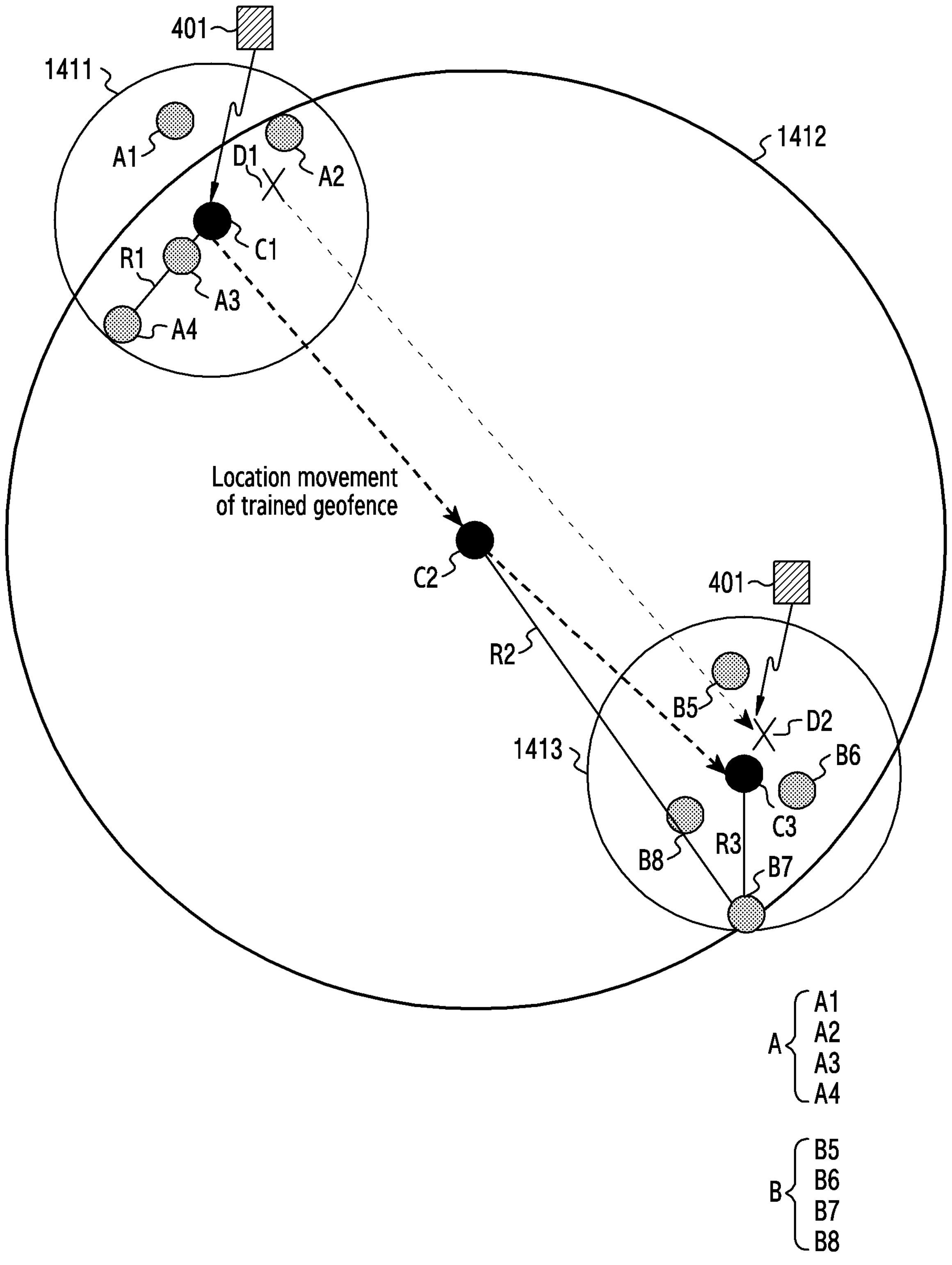
FIG. 14 illustrates an example in which an application processor determines a second geofence as a first external device moves from a first location to a second location according to an embodiment of the disclosure.

FIG. 14 illustrates an example in which an application processor determines a second geofence as a first external device moves from a first location to a second location according to an embodiment of the disclosure.

Referring to FIG. 14, the wireless communication chipset 220 according to an embodiment may scan an advertising signal of the first external device 401 with a first interval. In an embodiment, the wireless communication chipset 220 may receive a plurality of first advertising packets from the first external device 401 while the first external device 401 is located in a first point D1 through the scan. In an embodiment, the application processor 210 may measure first locations of the electronic device 101 in response to receiving the plurality of first advertising packets by the wireless communication chipset 220. For example, the application processor 210 may measure a first location A1 of the electronic device 101 in response to receiving a first advertising packet from the first external device located in the first point D1. As another example, the application processor 210 may measure a second location A2, a third location A3, and a fourth location A4 upon receiving a second advertising packet, a third advertising packet, and a fourth advertising packet, respectively, from the first external device 401 located in the first point D1. In an embodiment, the application processor 210 may determine a first geofence 1411, based on at least some of first locations A. For example, the application processor 210 may determine an average point of latitude and/or longitude of the first locations A as a first center point C1 of the first geofence 1411. In addition, the application processor 210 may determine a first distance R1 to the fourth location A4 farthest in distance from the first center point C1 as a radius of the first geofence 1411.

According to an embodiment, the first external device 401 may move from the first point D1 to a second point D2. The wireless communication chipset 220 may receive a plurality of second advertising packets from the first external device 401 while the first external device 401 is located in the second point. In an embodiment, the application processor 210 may measure second locations of the electronic device 101 in response to receiving the plurality of second advertising packets by the wireless communication chipset 220. For example, the application processor 210 may measure a fifth location B5 of the electronic device 101 in response to receiving a fifth advertising packet among the second advertising packets from the first external device 401 located in the second point D2. As another example, the application processor 210 may measure a sixth location B6, a seventh location B7, and an eighth location B8 upon receiving a sixth advertising packet, a seventh advertising packet, and an eighth advertising packet, respectively, from the first external device 401 located in the second point D2.

According to an embodiment, the application processor 210 may determine a second geofence 1412, based on at least some of the first locations A and second locations B. For example, the application processor 210 may determine the second geofence 1412, based on locations excluding the first location A1 having an old measurement timing from the first locations A1 and the second locations B. That is, the application processor 210 may determine the second geofence 1412, based on the second location A2, the third location A3, the fourth location A4, the fifth location B5, the sixth location B6, the seventh location B7, and the eighth location B8. In an embodiment, the application processor 210 may determine an average point of latitude and longitude of second location A2, the third location A3, the fourth location A4, the fifth location B5, the sixth location B6, the seventh location B7, and the eighth location B8 as a second center point C2 of the second geofence 1412. In addition, the application processor 210 may determine a second distance R2 from the second center point C2 to the seventh location B7 farthest from the second center point C2 as a second radius of the second geofence 1412. In an embodiment, the determining of the second geofence 1412 by the application processor 210 may mean substantially changing or updating a geofence corresponding to the first external device 401 from the first geofence 1411 to the second geofence 1412.

According to an embodiment, the application processor 210 may determine a third geofence 1413, based on at least some of the second locations B after determining the second geofence 1412. For example, the application processor 210 may determine the third geofence, based on only the second locations B other than the first locations A having old measurement timings among the first locations A and the second locations B. In an embodiment, the application processor 210 may determine an average point of latitude and longitude of the fifth location B5, the sixth location B6, the seventh location B7, and the eighth location B8 as a third center point C3 of the third geofence 1413. In addition, the application processor 210 may determine a third distance R3 from the third center point C3 to the seventh location B7 farthest in distance from the third center point C3 as a third radius. In an embodiment, the determining of the third geofence 1413 by the application processor 210 may mean substantially changing or updating a geofence corresponding to the first external device 401 from the second geofence 1412 to the third geofence 1413.

According to an embodiment, the electronic device 101 may identify a change in a center point and/or radius of a geofence corresponding to the first external device 401, and may change an interval of scanning an advertising packet of the first external device 401. For example, the wireless communication chipset 220 of the electronic device 101 may scan first advertising packets of the first external device 401 located in a first point D1 with a first interval. In an example, the application processor 210 may determine the first geofence 1411, based on the measured first locations of the electronic device 101, upon receiving the first advertising packets. However, with the location movement of the first external device 401 from the first point D1 to the second point D2, the second locations B2 may be measured, and thus the geofence corresponding to the first external device 401 may be changed to the second geofence 1412. With the change in the geofence corresponding to the first external device 401 from the first geofence 1411 to the second geofence 1412, the wireless communication chipset 220 may scan an advertising packet broadcast by the first external device 401 with a second interval shorter than the first interval. As a result, when the center point and/or radius of the geofence is changed, the electronic device 101 may set a scan interval of the wireless communication chipset 220 to be short, thereby decreasing a training time for determining the geofence corresponding to the first external device 401, and improving accuracy and/or reliability of the determined geofence.

The determining of the geofence, based on the location movement of the first external device 401 described above with reference to FIG. 14, may also be utilized in a case where the electronic device 101 does not identify the location of the first external device 401 which has moved to the second point. For example, when the first external device 401 is a television, a user may input to the electronic device 101 a location (e.g., latitude and longitude) of the first point D1 of the first external device 401. For example, the user may input to the electronic device 101 the location of the first point D1 through an application related to a geofence displayed on the display 250. The electronic device 101 which has identified the location of the first external device 401 located in the first point D1 may determine the first geofence 1411, based on at least some of the first locations A. After the first geofence 1411 is determined, the first external device 401 may move to the second point D2. However, the user may not input to the electronic device 101 the location (e.g., latitude and longitude) of the second point D2. In an embodiment, even if the user does not input to the electronic device 101 the location of the second point D2, the electronic device 101 may determine the third geofence 1413, based on at least some of the second locations B. In an embodiment, the electronic device 101 may estimate the location of the second point D2 in which the first external device 401 is located, based on the determined third geofence 1413. For example, the electronic device 101 may estimate the location of the third center point C3 of the determined third geofence 1413 as the second point D2. As a result, even if the location (e.g., latitude and longitude) of the second point D2 in which the first external device 401 is located is not input by the user, the electronic device 101 may estimate the location of the second point D2 of the first external device 401, based on the determined geofence (e.g., the third geofence 1413). In an example, the electronic device 101 may transmit the estimated location of the second point D2 to the external server, and the location of the second point D2 which is transmitted to the external server and in which the first external device 401 is located may be utilized in another service provided by the electronic device 101 to a user (e.g., based on an account). In an example, the user of the electronic device 101 may confirm whether the estimated location (e.g., latitude or longitude) of the second point D2 is identical to or corresponds to the location of the second point D2 in which the first external device 401 is substantially located. For example, the electronic device 101 may display an execution screen of an application associated with a geofence through the display 250, and the execution screen may include a first user interface for identifying whether the estimated location of the second point D2 is identical to the second point D2 in which the first external device 401 is substantially located. The electronic device 101 may identify whether the estimated location of the second point D2 is substantially identical or corresponds to the location of the second point D2, based on a user input for the first user interface. In an embodiment, when the estimated location of the second point D2 is not identical to an actual location or does not correspond thereto, the electronic device 101 may display on the display 250 a second user interface through which the user is able to input the location (e.g., latitude or longitude) of the second point D2 of the first external device 401.

Figure 15:
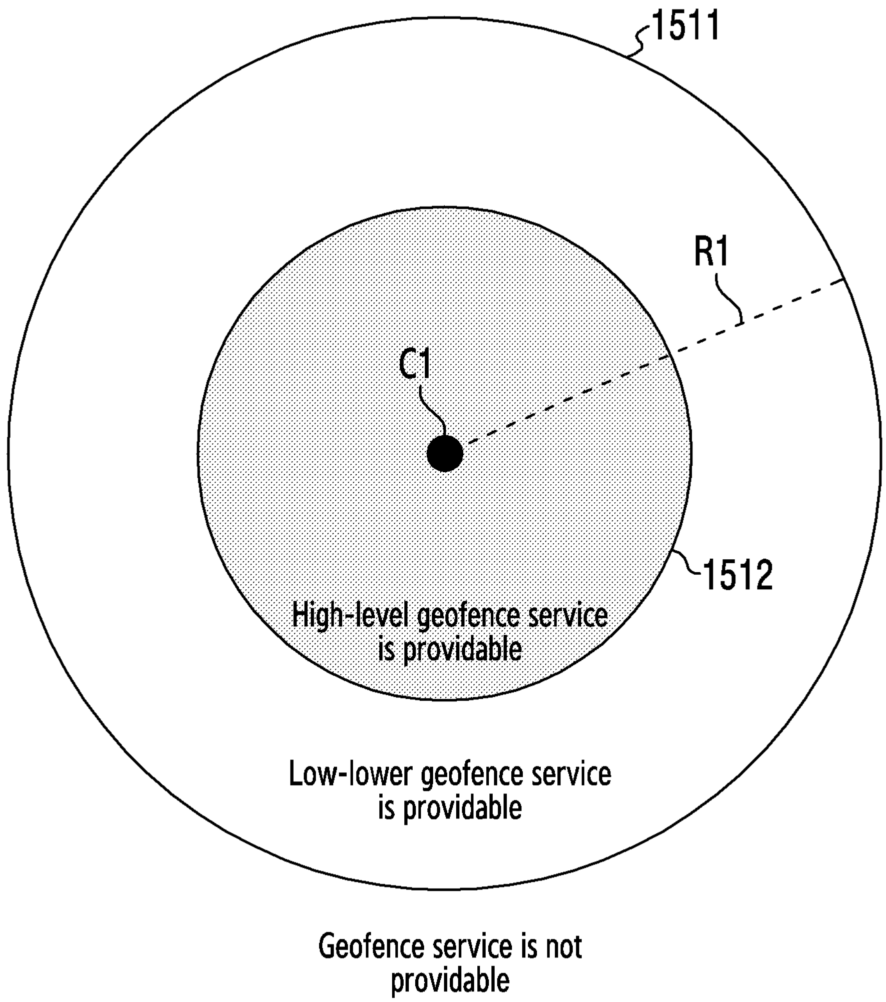
FIG. 15 illustrates a change in a service provided to a user depending on a size of a radius of a geofence corresponding to a first external device according to an embodiment of the disclosure.

FIG. 15 illustrates a change in a service provided to a user depending on a size of a radius of a geofence corresponding to a first external device according to an embodiment of the disclosure.

Referring to FIG. 15, the application processor 210 according to an embodiment may determine a first geofence 1511 corresponding to the first external device 401, based on measured locations. In an embodiment, the first geofence 1511 may have a first center point C1, and a first radius of the first geofence 1511 may correspond to a first distance R1.

In addition, the application processor 210 according to an embodiment may determine a second geofence 1512 corresponding to the first external device 401, based on the measured locations. In an embodiment, the second geofence 1512 may have the first center point C1, and a second radius of the second geofence 1512 may correspond to a second distance R2 shorter than the first distance R1. As a result, the second geofence 1512 may include a narrower range than the first geofence 1511.

According to an embodiment, the application processor 210 may provide a user with a service which differs depending on a radius of the determined geofence. For example, when the determined geofence is the first geofence 1511, the application processor 210 may provide the user with a function associated with a first-type geofence. On the other hand, when the determined geofence is the second geofence 1512, the application processor 210 may provide the user with a function related to a second-type geofence. In an embodiment, the function associated with the second-type geofence may include more types of functions and/or higher quality functions than the function associated with the first-type geofence. In other words, when the determined geofence is the second geofence 1512 with a relatively smaller radius than a case where the determined geofence is the first geofence 1511, the application processor 210 may provide the user with more types and/or higher quality functions.

Figure 16:
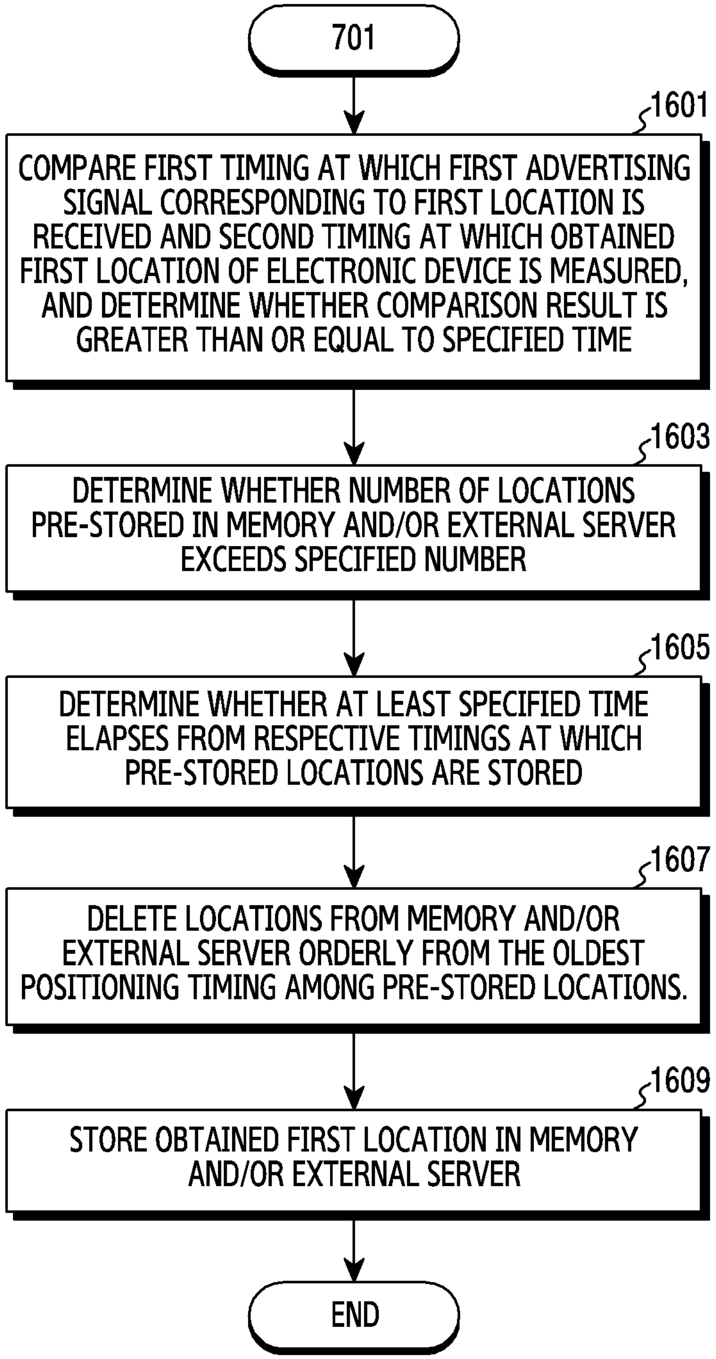
FIG. 16 illustrates an operation in which an application processor stores a measured first location of an electronic device according to an embodiment of the disclosure.

FIG. 16 illustrates an operation in which an application processor stores a measured first location of an electronic device according to an embodiment of the disclosure.

Referring to FIG. 16, in operation 1601, the application processor 210 according to an embodiment may compare a first timing at which a first advertising signal corresponding to a first location is received and a second timing at which the obtained first location of the electronic device 101 is measured, and may determine whether a comparison result is greater than or equal to a specified time. For example, the application processor 210 may compare the first timing at which the wireless communication chipset 220 receives the first advertising signal and the second timing at which the application processor 210 measures the first location of the electronic device 101 in response to receiving the first advertising signal by the wireless communication chipset 220. In an embodiment, when the first timing and the second timing differ by more than a specified time, the application processor 210 may not store the first location in the memory 130 and/or an external server.

According to an embodiment, in operation 1603, the application processor 210 may determine whether the number of locations pre-stored in the memory 130 and/or the external server exceeds a specified number. For example, the application processor 210 may determine whether the number of locations pre-stored in the memory 130 and/or the external server exceeds a number required to determine a geofence. In an embodiment, when the number of the pre-stored locations does not exceed the specified number, the application processor 210 may store the first location in the memory 130 and/or the external server.

According to an embodiment, in operation 1605, if the number of the pre-stored locations exceeds the specified number, the application processor 210 may determine whether at least a specified time elapses from respective timings at which the pre-stored locations are stored. For example, the application processor 210 may determine whether at least the specific time elapses from a third timing at which the first location among the pre-stored locations is stored in the memory 130 and/or the external server. In an embodiment, the application processor 210 may delete locations, for which at least the specified time elapses from timings at which the locations are stored among the pre-stored locations, from the memory 130 and/or the external server.

According to an embodiment, in operation 1607, if there is no locations for which at least the specified time elapses from the timing at which the locations are stored among the pre-stored locations, the application processor 210 may delete the locations from the memory 130 and/or the external server orderly from the oldest positioning timing. In an embodiment, the number of locations to be deleted may correspond to locations of the electronic device 101, newly obtained by the application processor 210. For example, if N denotes the number of locations pre-stored in the memory 130 and/or the external server and M denotes the number of locations of the electronic device 101, newly obtained by the application processor 210, the application processor 210 may delete M locations from the memory 130 and/or the external server orderly from the oldest measurement timings among the pre-stored locations.

According to an embodiment, in operation 1609, the application processor 210 may store the obtained first location in the memory 130 and/or the external server.

The embodiment of FIG. 16 of the disclosure may be combined with each of the embodiment of FIG. 6, the embodiment of FIG. 7A, the embodiment of FIG. 8, the embodiment of FIG. 9, the embodiment of FIG. 10, the embodiment of FIG. 11, and the embodiment of FIG. 13. For example, the operations 1601 to 1609 of FIG. 16 may correspond to the operation of identifying locations satisfying the specified condition of the operation 610 of FIG. 6. However, this is only an example, and a correspondence relation is not limited thereto.

Figure 17:
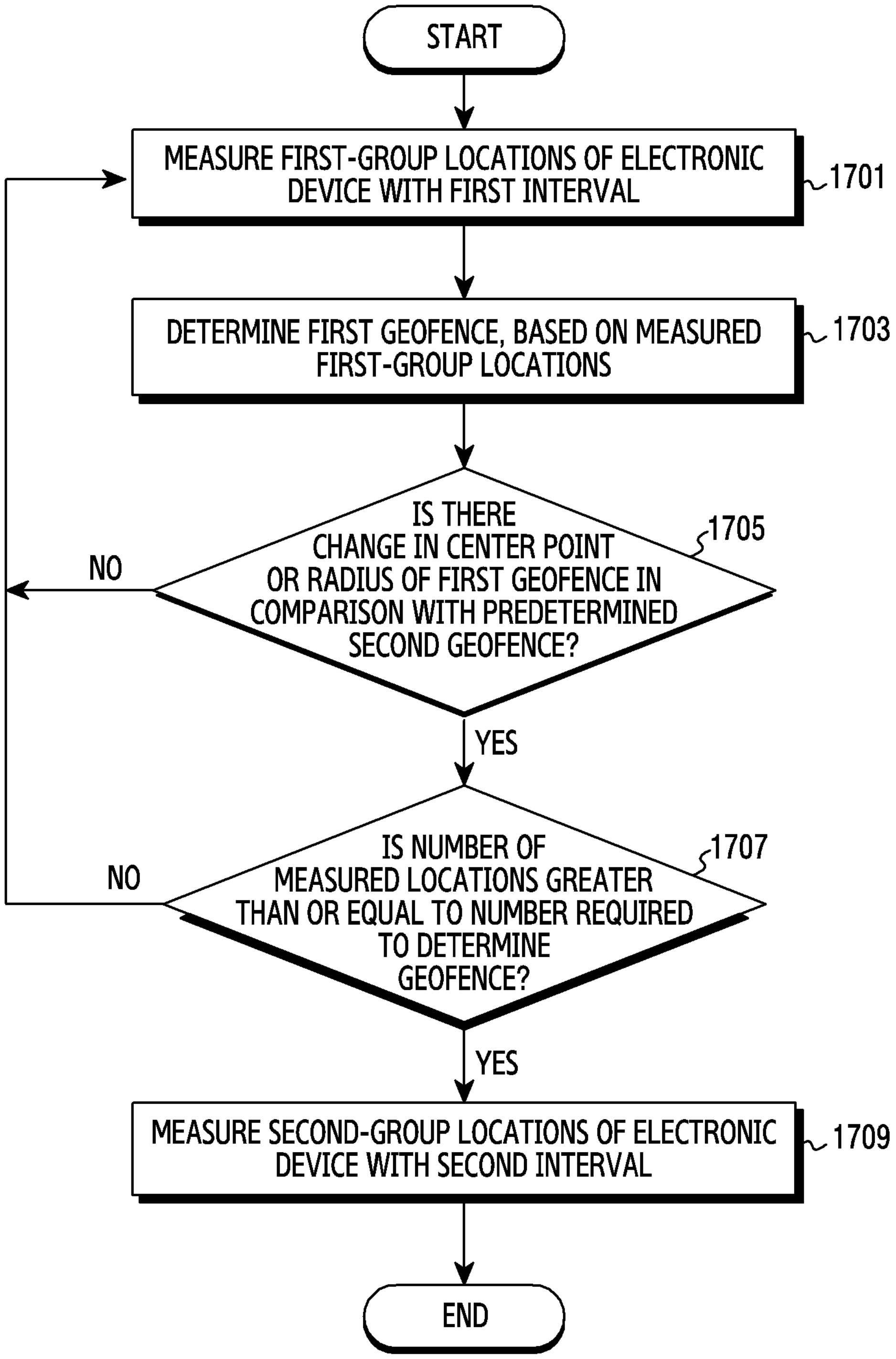
FIG. 17 is a flowchart illustrating an operation in which an application processor determines a positioning interval of an electronic device according to an embodiment of the disclosure.

FIG. 17 is a flowchart illustrating an operation in which an application processor determines a positioning interval of an electronic device according to an embodiment of the disclosure.

Referring to FIG. 17, in operation 1701, the application processor 210 according to an embodiment may measure first locations of the electronic device 101 with a first interval. For example, the application processor 210 may receive a plurality of advertising packets broadcast by the first external device 401, and may measure the locations of the electronic device 101 in response to the reception.

According to an embodiment, in operation 1703, the application processor 210 may determine a first geofence, based on the measured first locations. For example, the application processor 210 may learn the first geofence corresponding to the first external device 401 through the first locations.

According to an embodiment, in operation 1705, the application processor 210 may determine whether a center point or radius of the first geofence does not change in comparison with a predetermined second geofence. In an embodiment, the second geofence may mean a geofence which is determined before the application processor 210 determines the first geofence. In an embodiment, when a first center point of the first geofence differs from a second center point of the second geofence or when a first radius of the first geofence differs from a second radius of the second geofence, the application processor 210 may measure the first locations of the electronic device 101 with the first interval. In an embodiment, when it is said that the center points are different, it may mean that a location difference between the first center point and the second center point is greater than or equal to a specified value, and when it is said that the radii are different, it may mean that a difference between the first radius and the second radius is greater than or equal to a specified value. In another embodiment, when the first center point of the first geofence differs from the second center point of the second geofence or when the first radius of the first geofence differs from the second radius of the second geofence, the application processor 210 may measure the locations of the electronic device 101 with a third interval shorter than the first interval.

According to an embodiment, comparing the first geofence and the second geofence, when the center point or the radius changes, in operation 1707, the application processor 210 may determine whether the number of measured locations is greater than or equal to a number required to determine the geofence. In an embodiment, when the number of the measured first locations is less than the number required to determine the geofence, the application processor 210 may measure the first locations of the electronic device 101 with the first interval. In another embodiment, when the number of the measured first locations is less than the number required to determine the geofence, the application processor 210 may measure the locations of the electronic device 101 with the third interval shorter than the first interval.

According to an embodiment, when the number of the first locations is greater than or equal to the number required to determine the geofence, in operation 1709, the application processor 210 may measure second locations of the electronic device 101 with a second interval. In an embodiment, the second interval may mean an interval longer than the first interval.

As a result, when the center point or radius of the newly determined first geofence does not change compared to the predetermined second geofence, the application processor 210 may make a positioning interval long. Accordingly, when the location of the first external device 401 does not change, the application processor 210 may make the interval of positioning relatively long, thereby reducing power consumption of the electronic device 101.

In addition, when the center point or radius of the newly determined first geofence changes compared to the predetermined second geofence, the application processor 210 may continuously perform measurement with the first interval, or may perform measurement with the third interval shorter than the first interval. Accordingly, when the location of the first external device 401 changes, the application processor 210 may make the positioning interval relatively short, thereby determining the geofence rapidly and accurately and improving user convenience.

The embodiment of FIG. 17 of the disclosure may be combined with each of the embodiment of FIG. 6, the embodiment of FIG. 7A, the embodiment of FIG. 8, the embodiment of FIG. 9, the embodiment of FIG. 10, the embodiment of FIG. 11, the embodiment of FIG. 13, and the embodiment of FIG. 16.

The electronic device 101 according to an embodiment of the disclosure may include the one or more application processors 210, memory electrically coupled with the one or more application processors and storing one or more programs; and the wireless communication chipset 220 which supports a short-range communication and is electrically coupled to the one or more application processors. The wireless communication chipset 220 may be configured to receive an advertising packet broadcast by a first external device with a specified interval. The one or more programs include computer-executable instructions that, when executed by the one or more application processors 210, may cause the electronic device to obtain first locations of the electronic device 101, measured in response to receiving a plurality of first advertising packets by the wireless communication chipset 220 while the first external device 401 is located in a first point, and may determine a first geofence corresponding to the first external device located in the first point, based on at least some of the obtained first locations.

According to an embodiment, the one or more programs further comprise computer-executable instructions that may identify a first timing which is a timing of measuring a first location among the obtained first locations, identify a second timing at which the wireless communication chipset receives the first advertising packets corresponding to the first location, and determine the first geofence, based on second locations excluding the first location from the obtained first locations in case that a difference between the first timing and the second timing is greater than or equal to a specified time.

According to an embodiment, the one or more programs further comprise computer-executable instructions that may determine whether the number of the obtained first locations exceeds a specified number, identify second locations with a number exceeding the specified number in order of an oldest measurement timing among the obtained first locations in case that the number of the obtained first locations exceeds the specified number, and determine the first geofence, based on third locations excluding the second locations from the obtained first locations.

The electronic device according to an embodiment the first locations may be stored in the memory at respective measurement timings.

According to an embodiment, the one or more programs further comprise computer-executable instructions that may compare a first timing at which the first location among the first locations is stored in the memory and a second timing at which the one more application processors determine the first geofence, and determine the first geofence, based on second locations excluding the first location from the first locations if a difference between the first timing and the second timing is greater than or equal to a specified time.

According to an embodiment, the one or more application processors which are in a low-power state may be released from the low-power state when the wireless communication chipset receives the advertising packet of the first external device.

According to an embodiment, the one or more programs further comprise computer-executable instructions that may obtain second locations of the electronic device, measured in response to receiving a plurality of second advertising packets by the wireless communication chipset while a second external device is located in a second point adjacent to the first point, and determine a second geofence corresponding to the second external device located in the second point, based on at least some of the obtained second locations.

According to an embodiment, the one or more programs further comprise computer-executable instructions that may determine a third geofence corresponding to the first external device and the second external device, based on the first geofence and the second geofence.

According to an embodiment, the one or more programs further comprise computer-executable instructions that may support a function related to a first-type geofence to a user when the first geofence has a first radius, and support a function associated with a second-type geofence when the first geofence has a second radius smaller than the first radius.

According to an embodiment, the specified interval may be determined based on a communication environment between the wireless communication chipset and the first external device.

According to an embodiment, the one or more programs further comprise computer-executable instructions that may obtain second locations of the electronic device, measured in response to receiving a plurality of second advertising packets by the wireless communication chipset from the first external device in a state where the first external device moves to a second point different from the first point, and determine a second geofence corresponding to the first external device located in the second point, based on the second locations.

According to an embodiment, the wireless communication chipset may be further configured to receive the plurality of first advertising packets of the first external device with a first interval while the first external device is located in the first point, and receive the plurality of second advertising packets of the first external device with a second interval shorter than the first interval as the first external device moves to the second point.

An electronic device according to an embodiment may further include a display electrically coupled to the one or more application processors. The one or more programs further comprise computer-executable instructions that may display an execution screen of an application related to the geofence on the display. The execution screen may include at least one user interface which displays information on the determined first geofence.

The electronic device according to an embodiment may further include a location tracking circuit. The one or more programs further comprise computer-executable instructions that may identify a location of the electronic device by using the location tracking circuit.

The wireless communication chipset according to an embodiment may further include a wireless communication circuit and a sub processor.

According to an embodiment of the disclosure, the electronic device 101 may include the application processor 210 and the wireless communication chipset 220 which supports Bluetooth Low Energy (BLE) communication and is electrically coupled to the application processor 210. The wireless communication chipset 220 may be configured to receive the BLE signal broadcast by the first external device 401 with a specified interval. The application processor 210 may obtain first locations of the electronic device 101, measured in response to receiving a plurality of first BLE signals by the wireless communication chipset 220 while the first external device 401 is located in a first point, determine a first geofence corresponding to the first external device 401 located in the first point, based on at least some of the obtained first locations, obtain second locations of the electronic device 101, measured in response to receiving a plurality of second BLE signals by the wireless communication chipset 220 from the first external device 401 in a state where the first external device 401 moves to a second point different from the first point, and determine a second geofence corresponding to the first external device 401 located in the second point, based on at least some of the second locations.

The electronic device according to an embodiment may further include a memory in which the obtained first locations are stored. The application processor may determine whether the number of obtained first locations exceeds a specified number. If the number of the obtained first locations exceeds a specified number, the application processor 210 may delete the locations with a number exceeding the specified number from the memory in order of an oldest measurement timing among the first locations.

According to an embodiment, the application processor may identify a first timing which is a timing of measuring a first location among the obtained first locations, identify a second timing at which the wireless communication chipset receives the first BLE signal corresponding to the first location, and determine the first geofence, based on second locations excluding the first location from the obtained first locations if a difference between the first timing and the second timing is greater than or equal to a specified time.

According to an embodiment, the application processor which is in a low-power state may be released from the low-power state when the wireless communication chipset receives the BLE signal of the first external device with the specified interval.

According to an embodiment, the wireless communication chipset may be configured to receive the plurality of first BLE signals of the first external device with a first interval while the first external device is located in the first point, and receive the plurality of second BLE signals of the first external device with a second interval shorter than the first interval as the first external device moves to the second point.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A wireless communication device comprising:

at least one processor;

a wireless communication chipset supporting a short-range communication; and memory storing instructions that, when executed by the at least one processor individually or collectively, cause the wireless communication device to:

receive, from a first external wireless communication device, a plurality of first advertising packets with a specified interval via the wireless communication chipset while the wireless communication device moves, measure first locations of the wireless communication device in response to receiving the plurality of first advertising packets, identify, among the first locations, at least one location measured in at least one first time point, exclude the identified at least one location from the first locations, identify a center point of a first geofence corresponding to the first external wireless communication device and a radius of the first geofence, using second locations remaining after excluding the identified at least one location from the first locations, and determine the first geofence corresponding to the first external wireless communication device, using the center point and the radius, wherein the at least one first time point is after a specific time from at least one second time point, and wherein the at least one second time point is a time point in which at least one advertising packet corresponding to the at least one location is received.

2. The wireless communication device of claim 1, wherein the instructions, when executed by the at least one processor individually or collectively, cause the wireless communication device to:

identify a first time point at which a first location among the first locations is measured, identify a second time point at which the wireless communication chipset receives a first advertising packet corresponding to the first location, in case that a difference between the first time point and the second time point is greater than or equal to the specific time, exclude the first location from the first locations, and determine the first geofence, using the center point and the radius which are identified using the second locations remaining after excluding the first location from the first locations.

3. The wireless communication device of claim 1, wherein the instructions, when executed by the at least one processor individually or collectively, cause the wireless communication device to:

determine whether a number of the second locations exceeds a specified number, in case that the number of the second locations exceeds the specified number, identify third locations having a designated number in order of an oldest measurement time point among the second locations, exclude the third locations from the second locations, and determine the first geofence, using the center point and the radius which are identified using fourth locations remaining after excluding the third locations from the second locations.

4. The wireless communication device of claim 1, wherein the first locations are stored in the memory at each of measurement time points.

5. The wireless communication device of claim 4, wherein the instructions, when executed by the at least one processor individually or collectively, cause the wireless communication device to:

compare a first time point at which a first location among the first locations is stored in the memory and a second time point at which the at least one processor determines the first geofence, in case that a difference between the first time point and the second time point is greater than or equal to a specified time, exclude the first location from the second locations, and determine the first geofence, using the center point and the radius which are identified using third locations remaining after excluding the first location from the second locations.

6. The wireless communication device of claim 1, wherein the at least one processor which is in a low-power state is released from the low-power state when the wireless communication chipset receives each of the plurality of first advertising packets from the first external wireless communication device.

7. The wireless communication device of claim 1, wherein the instructions, when executed by the at least one processor individually or collectively, cause the wireless communication device to:

measure third locations of the wireless communication device in response to receiving a plurality of second advertising packets from a second external wireless communication device via the wireless communication chipset, identify a center point of a second geofence and a radius of the second geofence, using the third locations, and determine the second geofence corresponding to the second external wireless communication device, using the center point of the second geofence and the radius of the second geofence.

8. The wireless communication device of claim 7, wherein the instructions, when executed by the at least one processor individually or collectively, cause the wireless communication device to:

determine a third geofence corresponding to the first external wireless communication device and the second external wireless communication device, based on the first geofence and the second geofence.

9. The wireless communication device of claim 1, wherein the instructions, when executed by the at least one processor individually or collectively, cause the wireless communication device to:

support a function related to a first-type geofence to a user in case that the first geofence has a first radius, and support a function related to a second-type geofence in case that the first geofence has a second radius smaller than the first radius.

10. The wireless communication device of claim 1, wherein the specified interval is determined based on a communication environment between the wireless communication chipset and the first external wireless communication device.

11. The wireless communication device of claim 1, wherein the instructions, when executed by the at least one processor individually or collectively, cause the wireless communication device to:

measure third locations of the wireless communication device in response to receiving a plurality of second advertising packets via the wireless communication chipset from the first external wireless communication device in a state in which the first external wireless communication device moves, identify a center point of a second geofence and a radius of the second geofence, using the third locations, and determine the second geofence corresponding to the first external wireless communication device, using the center point of the second geofence and the radius of the second geofence.

12. The wireless communication device of claim 11, wherein the wireless communication chipset is further configured to:

receive the plurality of first advertising packets of the first external wireless communication device with a first interval while the first external wireless communication device is located in a first point, and receive the plurality of second advertising packets of the first external wireless communication device with a second interval shorter than the first interval as the first external wireless communication device moves from the first point to a second point.

13. The wireless communication device of claim 1, further comprising:

a display, wherein the instructions further cause the wireless communication device to display an execution screen of an application related to a geofence on the display, and wherein the execution screen includes at least one user interface which displays information on the determined first geofence.

14. The wireless communication device of claim 1, further comprising:

a location tracking circuit, wherein the instructions further cause the wireless communication device to identify a location of the wireless communication device by using the location tracking circuit.

15. The wireless communication device of claim 1, wherein the wireless communication chipset includes a wireless communication circuit and a sub processor.

16. A method performed by a wireless communication device, the method comprising:

receiving, from a first external wireless communication device, a plurality of first advertising packets with a specified interval via a wireless communication chipset of the wireless communication device while the wireless communication device moves;

measuring first locations of the wireless communication device in response to receiving the plurality of first advertising packets;

identifying, among the first locations, at least one location measured in at least one first time point;

excluding the identified at least one location from the first locations;

identifying a center point of a first geofence corresponding to the first external wireless communication device and a radius of the first geofence, using second locations remaining after excluding the identified at least one location from the first locations; and determining the first geofence corresponding to the first external wireless communication device, using the center point and the radius, wherein the at least one first time point is after a specific time from at least one second time point, and wherein the at least one second time point is a time point in which at least one advertising packet corresponding to the at least one location is received.

17. The method of claim 16, further comprising:

identifying a first time point at which a first location among the first locations is measured;

identifying a second time point at which the wireless communication chipset receives a first advertising packet corresponding to the first location;

in case that a difference between the first time point and the second time point is greater than or equal to the specific time, excluding the first location from the first locations; and determining the first geofence, using the center point and the radius which are identified using the second locations remaining after excluding the first location from the first locations.

18. The method of claim 16, further comprising:

determining whether a number of the second locations exceeds a specified number;

in case that the number of the second locations exceeds the specified number, identifying third locations having a designated number in order of an oldest measurement time point among the second locations;

excluding the third locations from the second locations; and determining the first geofence, using the center point and the radius which are identified using fourth locations remaining after excluding the third locations from the second locations.

19. A wireless communication device comprising:

at least one processor;

a wireless communication chipset supporting a short-range communication; and memory storing instructions that, when executed by the at least one processor collectively or individually, cause the wireless communication device to:

receive, from a first external wireless communication device, a plurality of first advertising packets with a specified interval via the wireless communication chipset while the wireless communication device moves, measure first locations of the wireless communication device in response to receiving the plurality of first advertising packets, identify at least one first time point in which at least one location among the first locations is obtained, identify at least one second time point in which at least one advertising packet corresponding to the at least one location is received, in response to a difference between the at least one first time point and the at least one second time point being greater than or equal to a specific time, exclude the identified at least one location from the first locations, identify a center point of a first geofence corresponding to the first external wireless communication device and a radius of the first geofence, using second locations remaining after excluding the identified at least one location from the first locations, and determine the first geofence corresponding to the first external wireless communication device, using the center point and the radius.

20. The wireless communication device of claim 19, wherein the first locations are stored in the memory at each of measurement time points.

* * * * *